(12) United States Patent
Bito

(10) Patent No.: US 7,900,959 B2
(45) Date of Patent: Mar. 8, 2011

(54) AIRBAG APPARATUS

(75) Inventor: Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 350 days.

(21) Appl. No.: 11/892,820

(22) Filed: Aug. 28, 2007

(65) Prior Publication Data

US 2008/0054608 A1    Mar. 6, 2008

(30) Foreign Application Priority Data

Aug. 30, 2006  (JP) ................... 2006-233801
May 23, 2007   (JP) ................... 2007-137126

(51) Int. Cl.
*B60R 21/272* (2006.01)
*B60R 21/264* (2006.01)

(52) U.S. Cl. .......................... 280/737; 280/741

(58) Field of Classification Search .............. 280/736, 280/741, 737; 102/530, 531; *B60R 21/272, B60R 21/268, 21/264*
See application file for complete search history.

(56) References Cited

U.S. PATENT DOCUMENTS

| | | | |
|---|---|---|---|
| 3,741,584 A | 6/1973 | Arai | |
| 3,758,131 A * | 9/1973 | Stephenson et al. | 280/735 |
| 3,861,710 A | 1/1975 | Okubo | |
| 3,868,126 A | 2/1975 | Radke et al. | |
| 4,998,751 A * | 3/1991 | Paxton et al. | 280/741 |
| 5,351,988 A * | 10/1994 | Bishop et al. | 280/737 |
| 5,513,879 A * | 5/1996 | Patel et al. | 280/739 |
| 6,149,193 A * | 11/2000 | Canterberry et al. | 280/741 |
| 6,793,244 B1 | 9/2004 | Katsuda et al. | |
| 6,874,813 B2 | 4/2005 | Perotto et al. | |
| 2006/0091660 A1 * | 5/2006 | Lang et al. | 280/737 |

FOREIGN PATENT DOCUMENTS

| | | |
|---|---|---|
| DE | 21 34 294 B | 6/1972 |
| DE | 22 51 836 A | 5/1973 |
| DE | 22 56 146 A | 6/1973 |
| DE | 43 20 147 A1 | 1/1994 |
| DE | 200 19 665 U 1 | 1/2001 |
| JP | A-2003-81050 | 3/2003 |
| JP | A-2006-143067 | 6/2006 |

OTHER PUBLICATIONS

Office Action issued from the Chinese Patent Office mailed on May 22, 2009 in the corresponding Chinese patent application No. 200710145944.8 (with English translation thereof).
Office Action issued from the German Patent Office mailed on Mar. 24, 2009 in the corresponding German patent application No. 10 2007 040 559.8-21 (with English translation thereof).

* cited by examiner

*Primary Examiner* — Faye M. Fleming
*Assistant Examiner* — Keith Frisby
(74) *Attorney, Agent, or Firm* — Posz Law Group, PLC

(57) ABSTRACT

The airbag apparatus includes an airbag housed in a folded state and an inflator for supplying inflation gas to the airbag. The inflator includes a first gas supply region and a second gas supply region respectively supplying inflation gas into the airbag under control of a control device. The first gas supply region is operable independently and in advance of the second gas supply region. The substance quantity of inflation gas supplied to the airbag by the first gas supply region per unit time at the time the first gas supply region operates independently and in advance of the second gas supply region is less than the substance quantity of inflation gas supplied to the airbag by the second gas supply region per unit time.

6 Claims, 18 Drawing Sheets

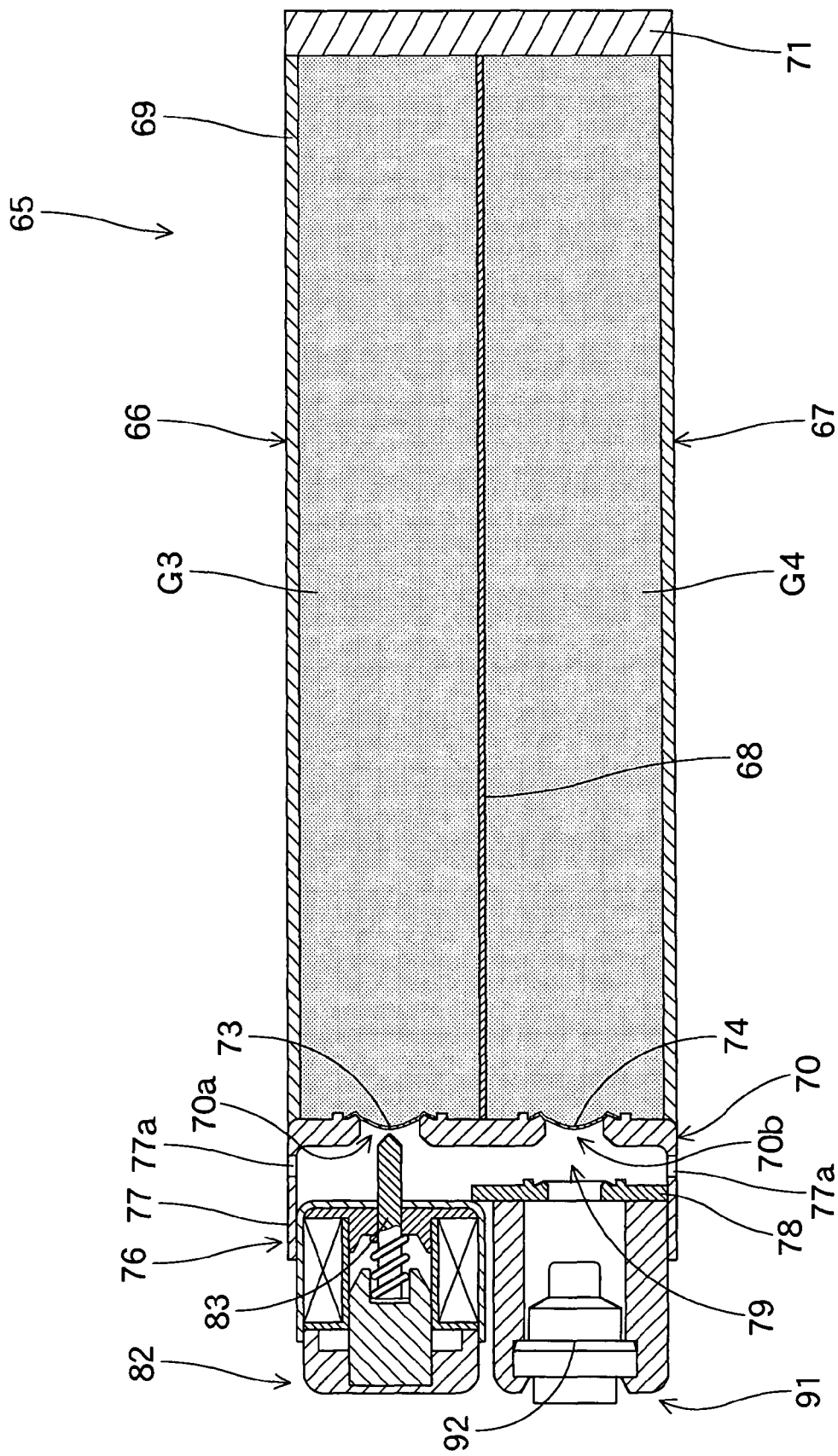

AIRBAG APPARATUS

The present application claims priority from Japanese Patent Application No. 2006-233801 of Bito et al., filed on Aug. 30, 2006 and Japanese Patent Application No. 2007-137126 of Bito et al., filed on May 23, 2007, the disclosures of which are hereby incorporated into the present application by reference.

BACKGROUND OF THE INVENTION

1. Field of the Invention

The present invention relates to an airbag apparatus including an airbag housed in a folded state and an inflator for supplying the airbag with inflation gas.

2. Description of Related Art

An airbag apparatus is known from JP 2003-81050: the apparatus has a hybrid inflator provided with a body including a squib or ignition device and a reservoir containing a pressurized gas. When the squib is ignited, a sealing member which has closed off the reservoir initially is broken to allow a first inflation gas to be discharged from a single discharge port located at a leading end of the inflator. After the first inflation gas is discharged from the reservoir, a gas generant arranged around the squib is combusted to generate a second inflation gas so that the internal pressure of an airbag is kept high for a prolonged period of time.

In the above airbag apparatus, despite the advantage that the internal pressure of the airbag is kept high for a long time, the internal pressure of the airbag tends to increase unduly at the initial stage of inflation because the inflator is configured to discharge the inflation gas rapidly from the single discharge port in the initial stage of airbag inflation. This arrangement can damage a vehicle occupant.

SUMMARY OF THE INVENTION

An object of the present invention is to provide an airbag apparatus in which the internal pressure of an airbag does not increase excessively in the initial stage of airbag inflation.

The object of the present invention is achieved by a first airbag apparatus having the following structure:

The apparatus includes an airbag housed in a folded state and an inflator for supplying inflation gas to the airbag. The inflator includes a first gas supply region and a second gas supply region respectively supplying inflation gas into the airbag under control of a control device. The first gas supply region is operable independently from the second gas supply region and in advance of the second gas supply region, and a substance quantity (amount of substance, mass amount) of inflation gas supplied to the airbag by the first gas supply region per unit time at the time the first gas supply region operates independently and in advance of the second gas supply region is less than a substance quantity of inflation gas supplied to the airbag by the second gas supply region per unit time.

In above first airbag apparatus of the present invention, the first gas supply region of the inflator is operable before the operation of the second gas supply region. Further, when the first gas supply region does operate ahead of the second region, the substance quantity of inflation gas supplied to the airbag by the first gas supply region per unit time is set less than that supplied to the airbag by the second gas supply region per unit time. That is, if the first gas supply region supplies the inflation gas first, the airbag expands with the inflation gas supplied moderately from the first gas supply region and then inflates with the inflation gas fed from the second gas supply region whose supplied substance quantity per unit time is greater than that from the first gas supply region, so that the airbag inflates swiftly. According to the present invention, therefore, it is prevented that a great amount of inflation gas is fed into the airbag rapidly in the initial stage of operation of the inflator and that the internal pressure of the airbag increases excessively in the initial stage of airbag inflation.

Therefore, the first airbag apparatus according to the present invention conduces to suppress the excessive increase of the internal pressure of the airbag in the initial stage of airbag inflation.

The above airbag apparatus may be constructed such that the control device is electrically connected with a pre-crash sensor which is capable of detecting an unavoidable crash of a vehicle before an actual crash and a crash sensor which detects an actual crash of the vehicle and that the control device operates the first gas supply region upon receipt of signals from the pre-crash sensor and operates the second gas supply region upon receipt of signals from the crash sensor.

With this structure, the inflation gas supplied by the first gas supply region flows into the airbag gently before an actual impact so the airbag inflates gently while unfolding, and thereafter, when an actual impact is detected, the airbag is inflated to the full with the inflation gas supplied by the second gas supply region whose supplied substance quantity per unit time is greater than that of the inflation gas fed from the first gas supply region. In other words, since the airbag is fed with inflation gas ahead of the detection of an actual crash by the first gas supply region, the internal pressure of the airbag is suppressed from increasing rapidly during the time period from the detection of an actual crash to the completion of inflation in comparison with an instance where an airbag starts to inflate with inflation gas upon a detection of an actual crash. Therefore, when the airbag apparatus is directed to protect an occupant during the time period from the detection of a crash to the full airbag inflation, the airbag does not apply an undue pressure to the occupant, and moreover, since the airbag already has an internal pressure of a certain level at the time of the crash, it protects the occupant smoothly with a good cushioning property. Of course, in this airbag apparatus, too, the airbag completes inflation after the detection of a crash and is kept fully inflated for a certain time period in a similar manner to an instance where an airbag starts to be inflated after a detection of a crash.

The above airbag apparatus may be alternatively designed such that the first gas supply region and the second gas supply region are operable substantially simultaneously. With this structure, in the event that the pre-crash sensor failed to detect a potential impact, the airbag can be inflated swiftly by actuating the first and second gas supply regions generally simultaneously after the detection of an actual impact.

The above airbag apparatus may be constructed more specifically as follows:

The inflator includes a gas generating chamber filled up with a pressurized gas, which gas is a compressed gas for inflating the airbag;

the first gas supply region includes a first gas channel communicated with the gas generating chamber and a valve mechanism operating to open and close the first gas channel; and the second gas supply region includes a second gas channel disposed adjacent the gas generating chamber and partitioned from the gas generating chamber by a sealing member and a squib disposed inside the second gas channel for ignition to generate a gas, the sealing member operating to provide a communication between the second gas supply region and the gas generating chamber when the squib is ignited and an internal pressure inside the second gas channel is increased.

With this structure, the inflator is constructed with a single gas generating chamber, which simplifies the structure of the inflator.

Alternatively, the airbag apparatus may be constructed such that the inflator includes a first gas generating chamber and a second gas generating chamber partitioned from the first gas generating chamber by a partitioning wall; the first gas supply region is disposed on the first gas generating chamber while the second gas supply region is disposed on the second gas generating chamber; and that the first gas supply region and the second gas supply region are operable independently from each other.

The above-described object of the present invention is also achieved by a second airbag apparatus having the following structure:

The airbag apparatus includes an airbag housed in a folded state and an inflator for supplying an inflation gas to the airbag. The inflator includes a first gas generating chamber, a second gas generating chamber partitioned from the first gas generating chamber by a partitioning wall, and a first gas supply region and a second gas supply region respectively supplying an inflation gas into the airbag under control of a control device, the first gas supply region being disposed on the first gas generating chamber and the second gas supply region being disposed on the second gas generating chamber. The first gas generating chamber and the second gas generating chamber are respectively charged with a gas material capable of generating the inflation gas enough to keep the airbag fully inflated on its own. The first gas supply region and the second gas supply region are operable independently from each other. Further, the substance quantity of the inflation gas supplied to the airbag by the first gas supply region per unit time is less than that supplied to the airbag by the second gas supply region per unit time.

In the second airbag apparatus according to the present invention, too, the substance quantity of the inflation gas supplied to the airbag by the first gas supply region per unit time is less than the substance quantity of the inflation gas supplied to the airbag by the second gas supply region per unit time. Hence, with the operation of only the first gas supply region in the initial stage of airbag inflation, the airbag expands and inflates with the inflation gas supplied moderately from the first gas supply region. Accordingly, it is prevented that a great amount of inflation gas is fed into the airbag rapidly in the initial stage of operation of the inflator and that the internal pressure of the airbag increases excessively in the initial stage of airbag inflation.

Therefore, the second airbag apparatus also conduces to suppress an excessive increase of the internal pressure of the airbag in the initial stage of airbag inflation.

Especially in the second airbag apparatus, each of the first gas generating chamber and the second gas generating chamber of the inflator is charged with gas material capable of producing inflation gas enough to keep the airbag fully inflated on its own. Further, the first gas supply region arranged to correspond to the first gas generating chamber and the second gas supply region arranged to correspond to the second gas generating chamber are operable independently from each other. With this structure, the quantity of inflation gas discharged from the inflator can be varied depending upon the physical size or seating position of vehicle occupants by adjusting the way the first gas supply region and the second gas supply region operate, which conduces to protect the occupants properly by the fully inflated airbag.

Moreover, it will also be appreciated in the second airbag apparatus that the control device is electrically connected with a pre-crash sensor which is capable of detecting an unavoidable crash of a vehicle before an actual crash and a crash sensor which detects an actual crash of the vehicle, and that the control device operates only the first gas supply region upon receipt of signals from the pre-crash sensor and operates only the second gas supply region upon receipt of signals from the crash sensor under a condition where the control device has not received signals from the pre-crash sensor.

BRIEF DESCRIPTION OF DRAWINGS

FIG. 15 is a schematic section of an inflator body used for the airbag apparatus of FIG. 14;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
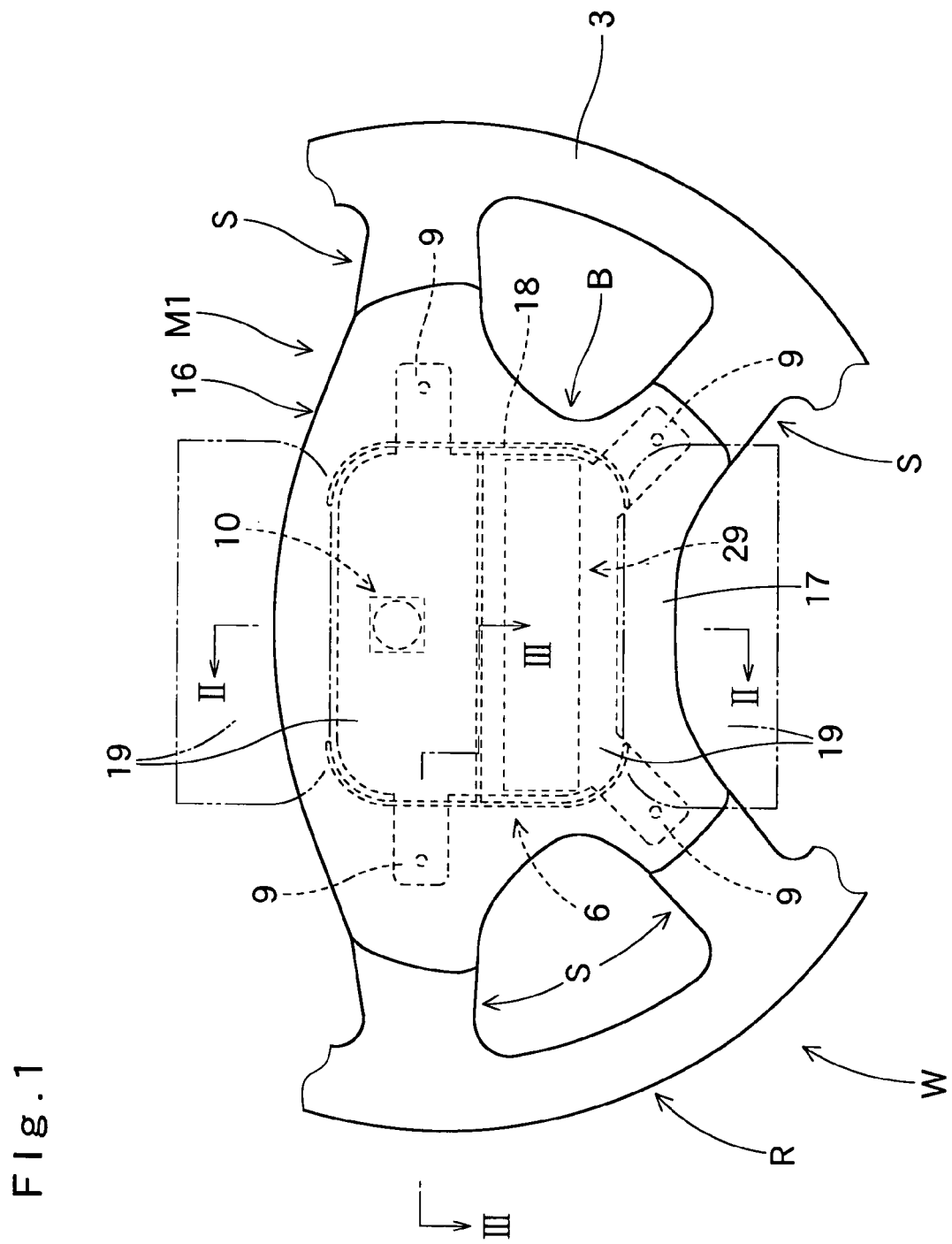
FIG. 1 is a partial plan view of a steering wheel equipped with an airbag apparatus according to the first embodiment of the present invention.
Figure 2:
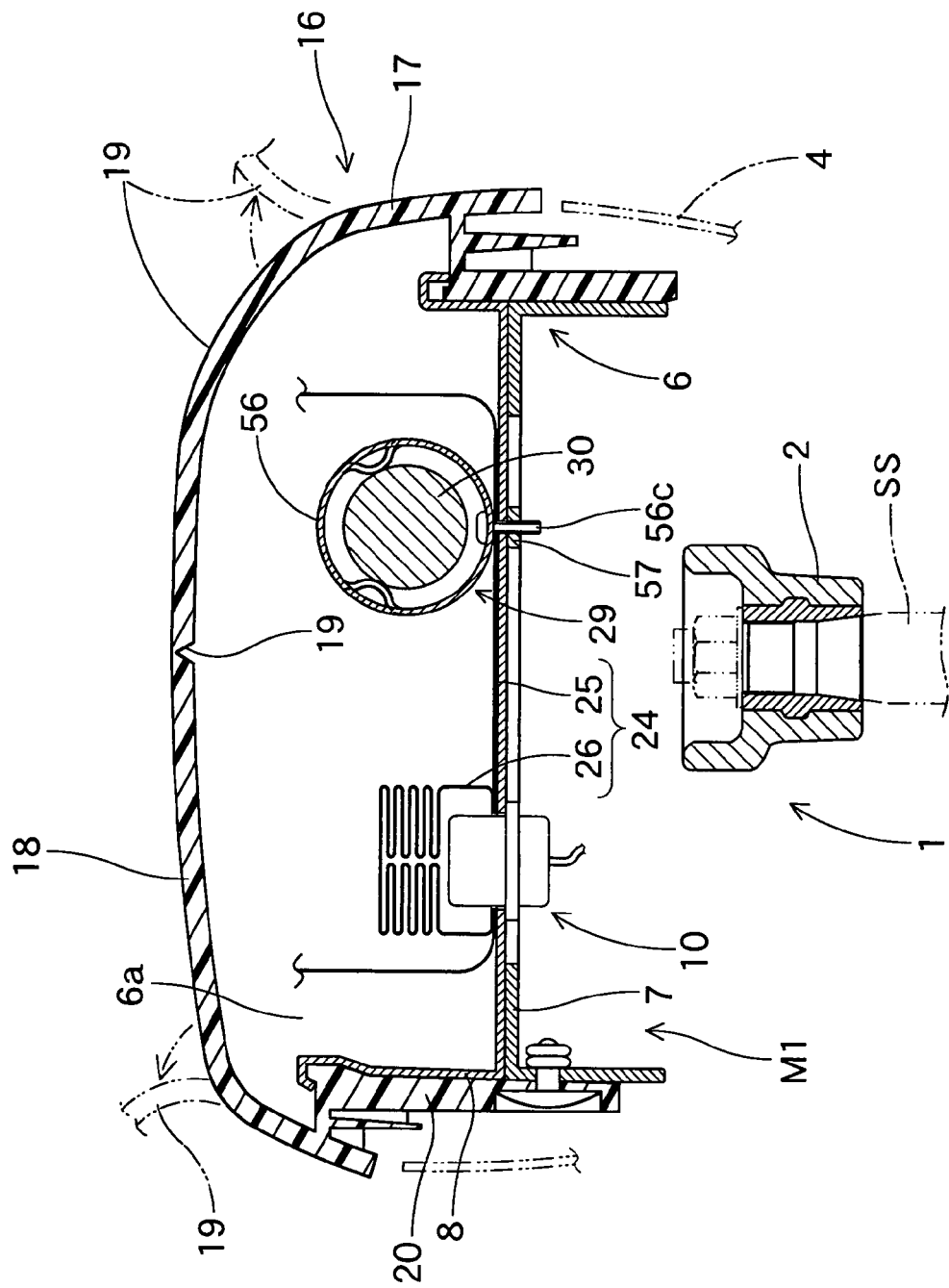
FIG. 2 is a schematic section of the airbag apparatus of FIG. 1 taken along line II-II of FIG. 1.
Figure 3:
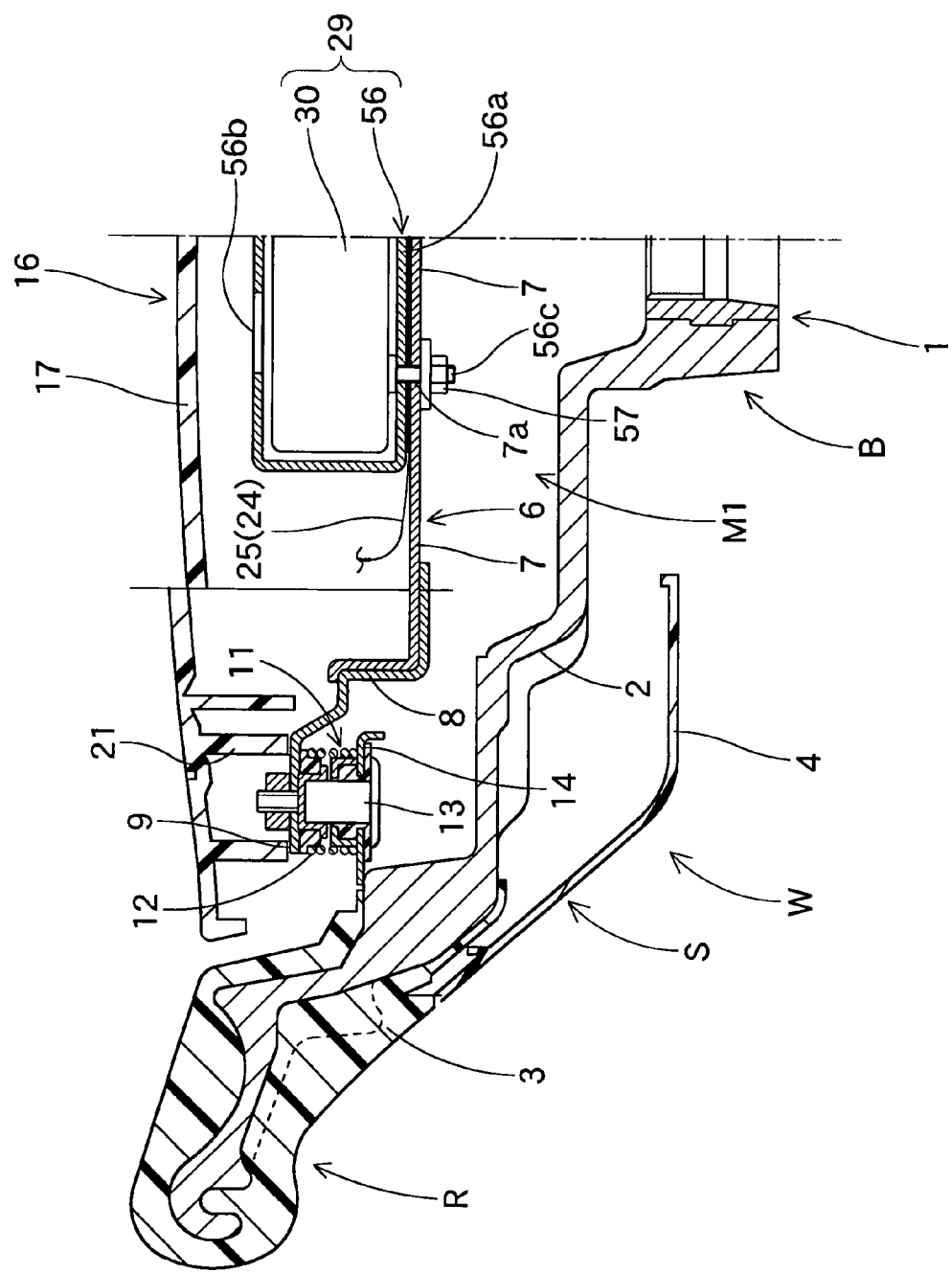
FIG. 3 is a schematic section of the airbag apparatus of FIG. 1 taken along line III-III of FIG. 1.

FIGS. 1 to 3 illustrate an airbag apparatus M1 for a steering wheel according to the first embodiment of the present invention.

Unless otherwise specified, front/rear, up/down, and left/right directions in the following embodiments are based on a steering wheel W mounted on a vehicle and steered straight ahead. Specifically, the up/down is intended to refer to the up/down direction extending along the axial direction of a steering shaft SS (refer to phantom lines in FIG. 2) on which the steering wheel W is mounted. The front/rear is intended to refer to the vehicle's front/rear direction running orthogonal to the axial direction of the steering shaft SS, and the left/right is intended to refer to the vehicle's lateral direction running orthogonal to the axial direction of the steering shaft SS.

As shown in FIGS. 2 and 3, the airbag apparatus M1 is mounted on top of a boss B located at the center of the steering wheel W. The steering wheel W includes a ring R, the boss B and four spokes S. The ring R is for holding at the time of steering operation. The boss B is disposed at the center of the steering wheel W and is joined with the steering shaft SS. The spokes S interconnect the ring R and the boss B. The steering wheel W includes, as components, an airbag device M1 and a steering wheel body 1.

The wheel body 1 includes a wheel core 2, a cladding layer 3 and a lower cover 4. The wheel core 2 is fabricated of aluminum alloy or the like and has such a configuration as to connect the ring R, boss B and spokes S. The cladding layer 3 is made from synthetic resin for cladding the core 2 at the ring R and regions of the spokes S in the vicinity of the ring R. The lower cover 4 is fabricated of synthetic resin and is disposed below the boss B.

As shown in FIGS. 2 and 3, the airbag apparatus M1 includes a folded airbag 24, a micro gas generator 10 for supplying inflation gas to an auxiliary bag 26 disposed inside the airbag 24, an inflator 29 for supplying inflation gas to a bag body 25 of the airbag 24, a housing or bag holder 6 which houses and holds the airbag 24, the inflator 29 and the gas generator 10, and a pad 16 serving as an airbag cover. The gas generator 10 and the inflator 29 are controlled by a control device 59.

Figure 11:
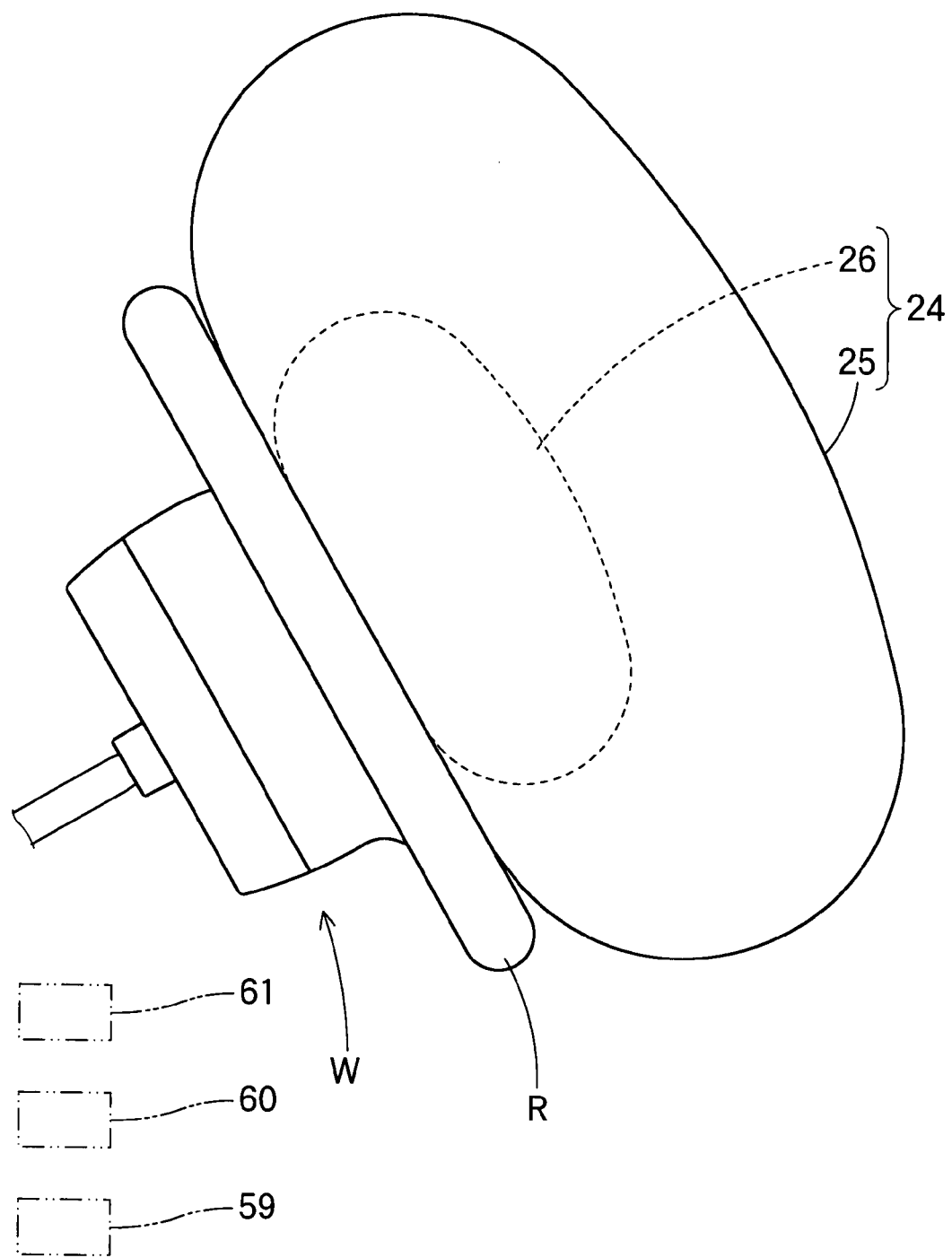
FIG. 11 is a schematic side view of the fully inflated airbag.

As shown in FIG. 11, the control device 59 is electrically connected with a pre-crash sensor 60 such as a millimeter wave radar, which can predict an impact, and a crash sensor 61 such as an acceleration sensor for detecting the deceleration of a vehicle upon an actual impact. The control device 59 operates the gas generator 10 and the inflator 29 in response to electric signals fed from these sensors 60 and 61.

As shown in FIGS. 2 and 3, the bag holder 6 is formed by connecting several pieces of sheet metal by welding, caulking or the like, and includes a bottom wall 7 having a generally rectangular plate shape and a tubular side wall 8 extending upward from the outer edge of the bottom wall 7 and opened upward. The bottom wall 7 has apertures 7a for receiving bolts 56c formed on a later-described diffuser 56 of the inflator 29, as shown in FIG. 3. The micro gas generator 10 for feeding the auxiliary bag 26 with inflation gas is secured to a predetermined position of the bottom wall 7. The bag holder 6 supports a side wall 20 of the pad 16 with rivets or the like at not-shown positions of the side wall 8. As shown in FIG. 1, at the vicinities of four corners of the side wall 8 of the bag holder 6 are joint pieces 9 projecting outwardly. Horn switches 11 are attached to the lower sides of the joint pieces 9 by bolts 13.

Each of two pairs of front and rear horn switches 11 located at the left hand side and right hand side is connected with each other and held at lower sides thereof by a joining plate 14 extending in an anterior-posterior direction. Each of the joining plates 14 is supported at the lower side thereof by regions of the wheel core 2 corresponding to front and rear spokes S of the steering wheel W. Each of the joining plates 14 is mounted at its longitudinal center on an unillustrated mounting seat of the wheel body 1 disposed in such a manner as to connect the regions of the wheel core 2 corresponding to the spokes S, thereby the inflator 29, the airbag 24 and the pad 16 held by the bag holder 6 are secured to the steering wheel body 1. Ribs 21 of the pad 16 are disposed in contact with top surfaces of the joint pieces 9 (FIG. 3), so that the horn switch 11 operates if the pad 16 is pressed to overcome the biasing force of a coil spring 12 of any of the horn switches 11 and predetermined contact points contact each other.

The pad 16 serving as the airbag cover is made from synthetic resin such as thermo-plastic elastomer of olefin, styrene or the like. As shown in FIGS. 2 and 3, the pad 16 includes a ceiling wall 17 disposed in such a manner as to cover an opening 6a of the bag holder 6 above the boss B, a side wall 20 extending downward from an outer edge region of the ceiling wall 17 to have a generally square cylindrical shape, and the ribs 21 projecting downward from the ceiling wall 17 outside the side wall 20. An area of the ceiling wall 17 inside the sidewall 20 serves to cover the folded airbag 24, and is provided with more than one door 19 openable upon airbag inflation, together with a breakable portion 18 around the doors 19. Two of the doors 19 are arranged one behind the other as shown in FIG. 1 in this specific embodiment. These doors 19 are openable forward and rearward when pushed by the auxiliary bag 26 filled up with inflation gas while breaking the breakable portion 18 arranged therearound generally in an H shape. The side wall 20 is secured to the side wall 8 of the bag holder 6 with rivets. Each of the ribs 21 has a generally cylindrical shape and is disposed to abut on the top surface of each of the joint pieces 9 of the bag holder 6.

Figure 9:
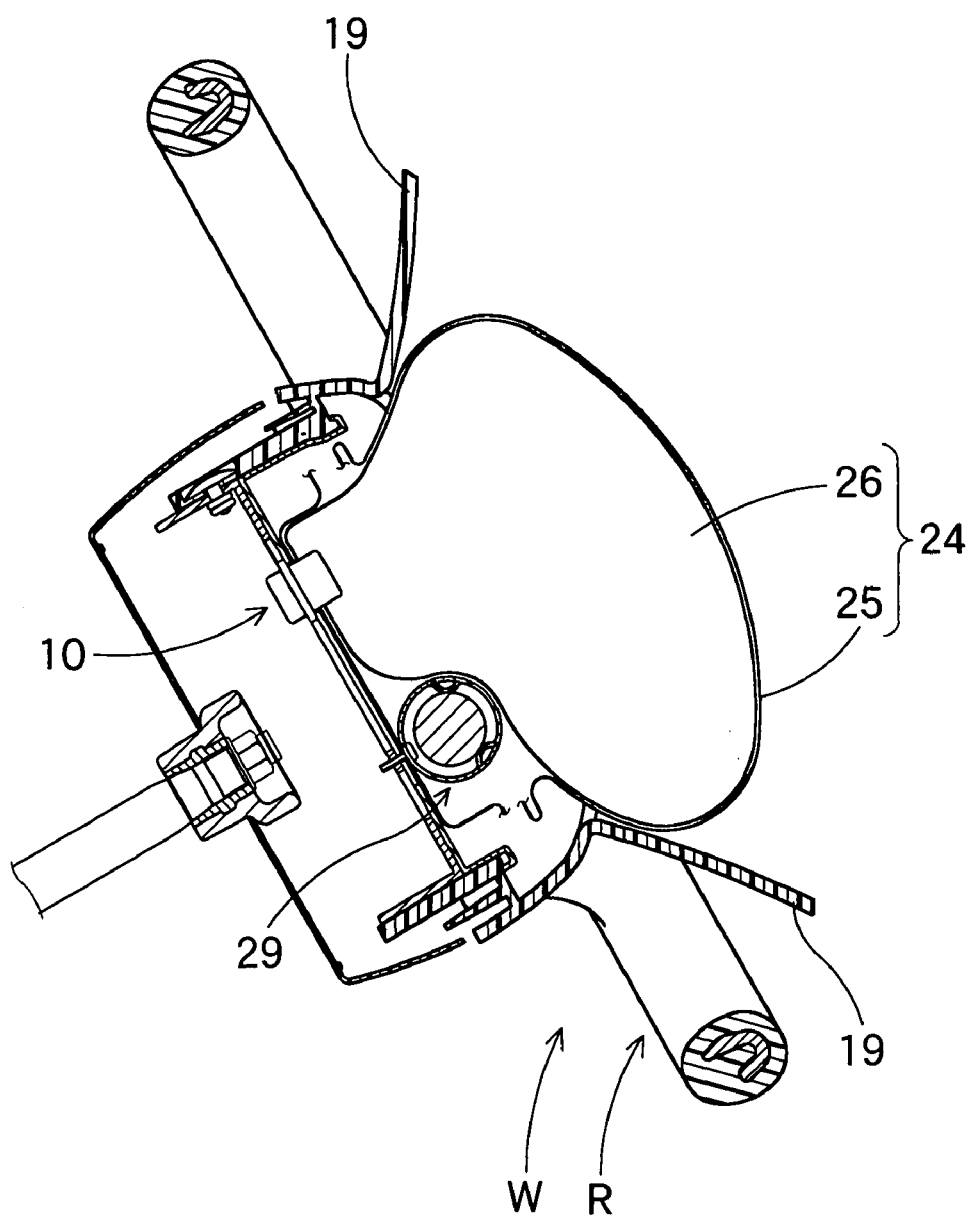
FIG. 9 is a schematic section of the airbag apparatus of FIG. 1 in operation, particularly showing an initial stage of airbag inflation where an inflated auxiliary bag of the airbag pushing and opening doors of an airbag cover.
Figure 10:
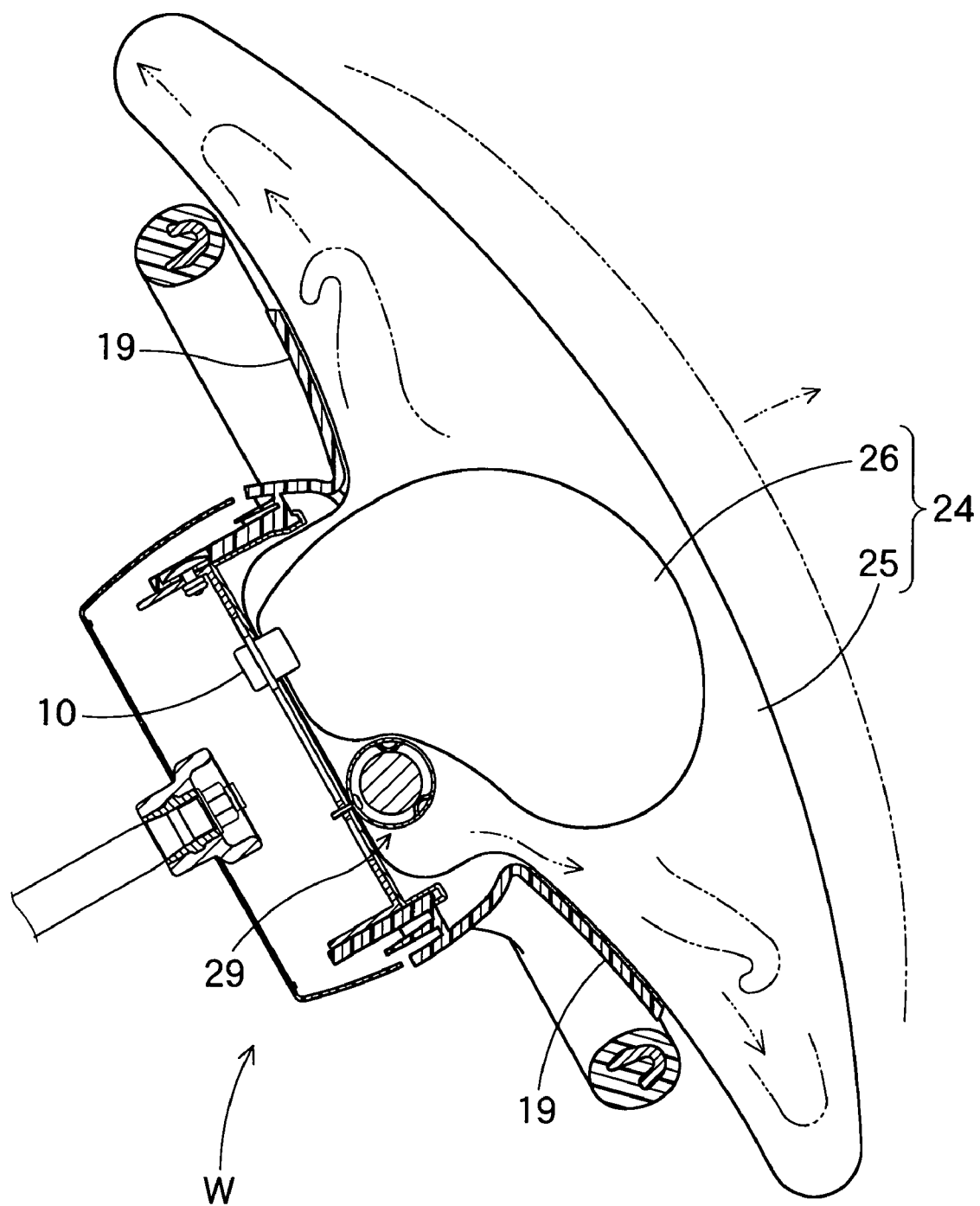
FIG. 10 is a schematic section of the airbag apparatus of FIG. 1 in operation, particularly showing an airbag body unfurling following the inflation of the auxiliary bag in the initial stage of airbag inflation.

As shown in FIGS. 9 to 11, the airbag 24 includes a bag body 25 deployable to cover a whole top of the steering wheel W and an auxiliary bag 26 disposed inside the bag body 25. The auxiliary bag 26 is prepared separate from the bag body 25 and is inflatable into a bag shape by inflation gas discharged from the micro gas generator 10 secured to the bag holder 6. When inflated, the auxiliary bag 26 occupies an inner space of the bag holder 6 and pushes and opens the doors 19 of the pad 16. The bag body 25 is inflatable with inflation gas discharged from the inflator 29. When fully inflated, it is formed into a generally discoid contour covering the whole top of the steering wheel W as shown in FIG. 11.

The micro gas generator 10 is electrically connected with the control device 59, and discharges inflation gas into the auxiliary bag 26 in response to signals from the control device 59 when the control device 59 detects that an impact is unavoidable before an impact by signals sent from the pre-crash sensor 60.

Figure 4:
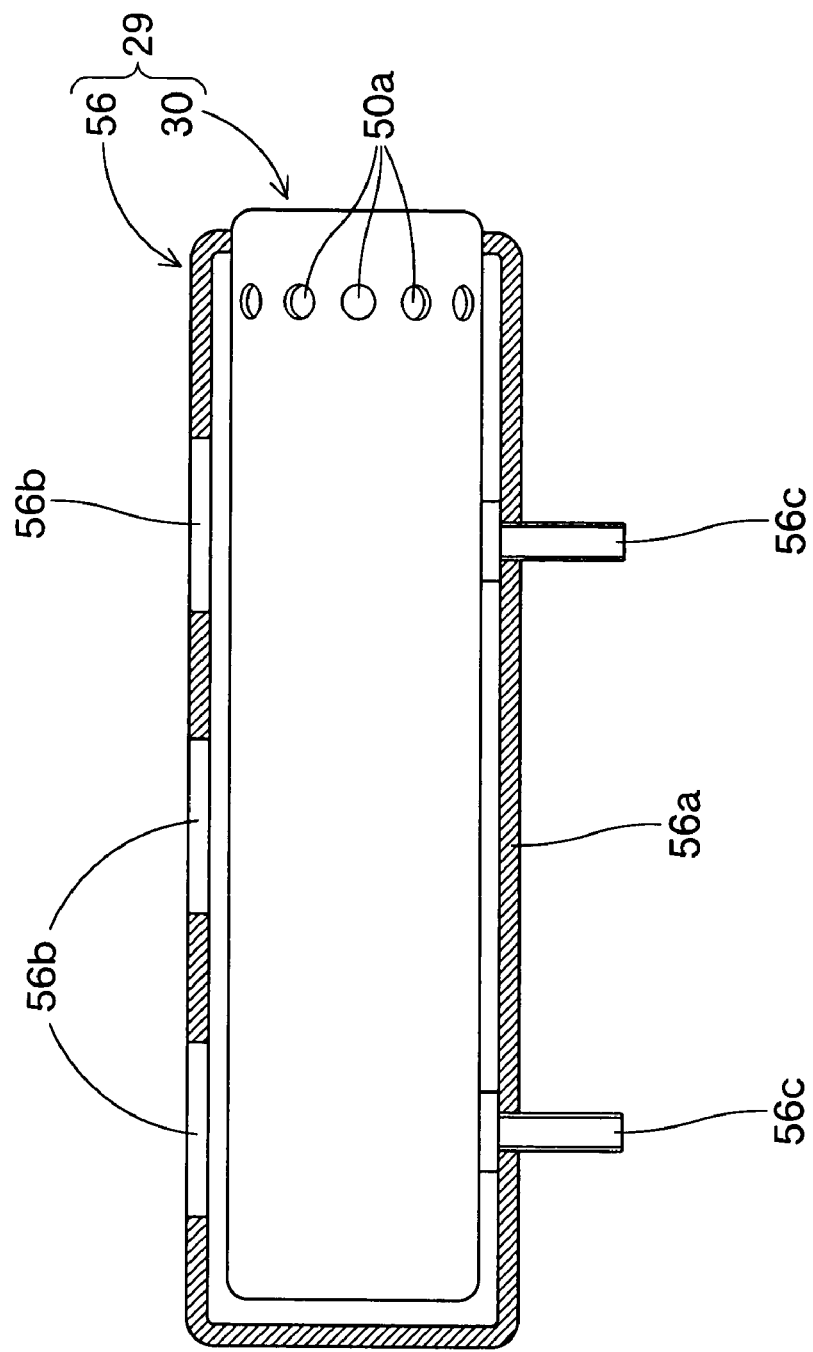
FIG. 4 is a schematic side view of an inflator used in the airbag apparatus of FIG. 1.

As shown in FIG. 4, the inflator 29 has a cylindrical shape, and includes an inflator body 30 having a generally columnar shape and a diffuser 56 having a generally cylindrical shape and mounted around the inflator body 30.

Figure 5:
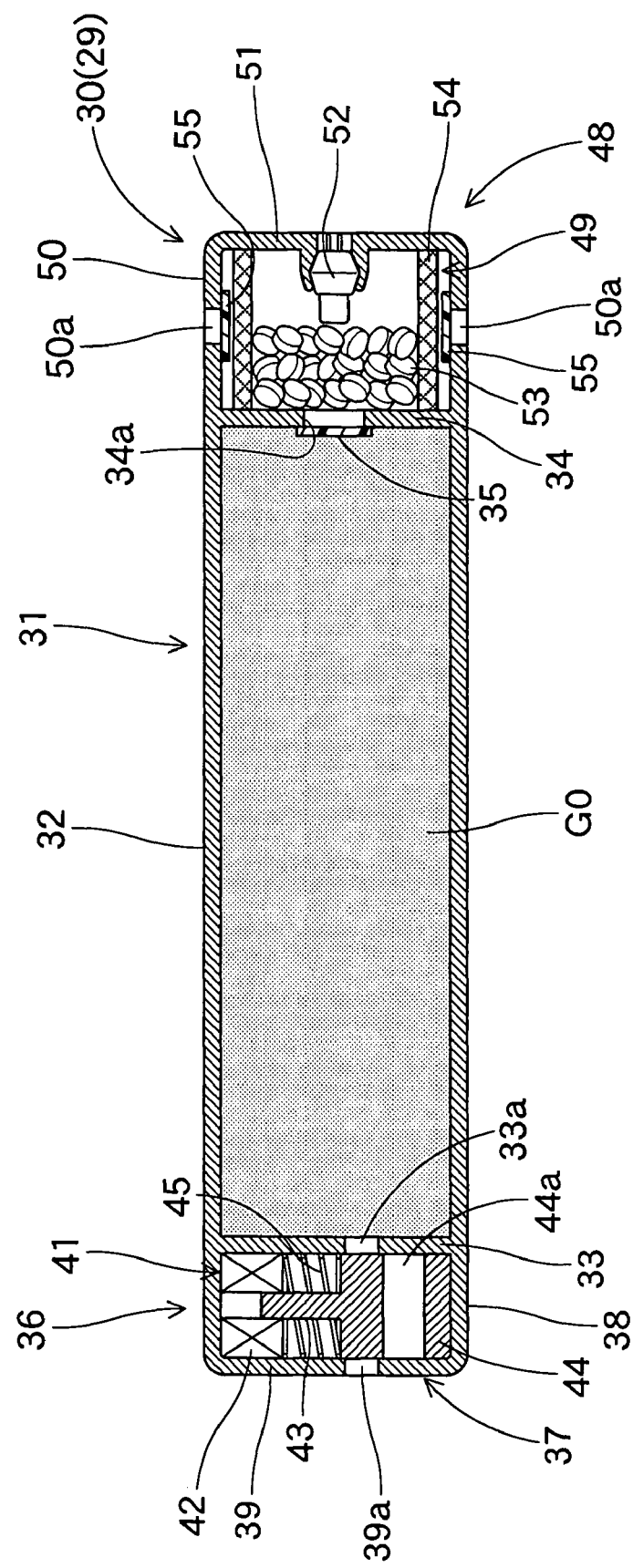
FIG. 5 is a schematic section of a body of the inflator of FIG. 4.

Referring to FIG. 5, the inflator body 30 includes a gas generating chamber 31 filled up with a pressurized gas G0, which is a compressed gas for inflating the airbag, and a first gas supply region 36 and a second gas supply region 48 for supplying the bag body 25 with inflation gas G1 and G2, respectively. The first gas supply region 36 and the second gas supply region 48 are disposed at opposite axial ends of the gas generating chamber 31.

As shown in FIG. 5, the gas generating chamber 31 is defined by a circumferential wall 32 having a generally cylindrical shape and generally round partitioning walls 33 and 34 disposed in such a manner as to close off opposite axial ends of the circumferential wall 32. The gas generating chamber 31 contains pressurized gas G0 such as nitrogen gas, helium gas, argon gas, or mixed gas of those gasses. The partitioning walls 33 and 34 are each provided with an orifice 33a and 34a which provide communication with the first gas supply region 36 and second gas supply region 48. The orifice 34a formed adjacent the second gas supply region 48 is sealed off by a sealing member 35 from the interior of the gas generating chamber 31. In this first embodiment, the orifice 34a for providing communication with the second gas supply region 48 has a greater opening area than that of the orifice 33a communicating the gas generating chamber 31 and the first gas supply region 36 so that greater amount of inflation gas is fed to the second gas supply region 48.

The first gas supply region 36 has a first gas channel 37 in communication with the gas generating chamber 31 and an electromagnetic valve 41 used to open or close the first gas channel 37. The first gas channel 37 includes a cylindrical circumferential wall 38 extending from the circumferential wall 32 of the gas generating chamber 31 in an integrated fashion and an end wall 39 provided with an aperture 39a which provides a partial opening on a leading end region of the circumferential wall 38. The aperture 39a is formed at a position corresponding to the orifice 33a of the partitioning wall 33 in the axial direction of the inflator body 30.

Figure 6:
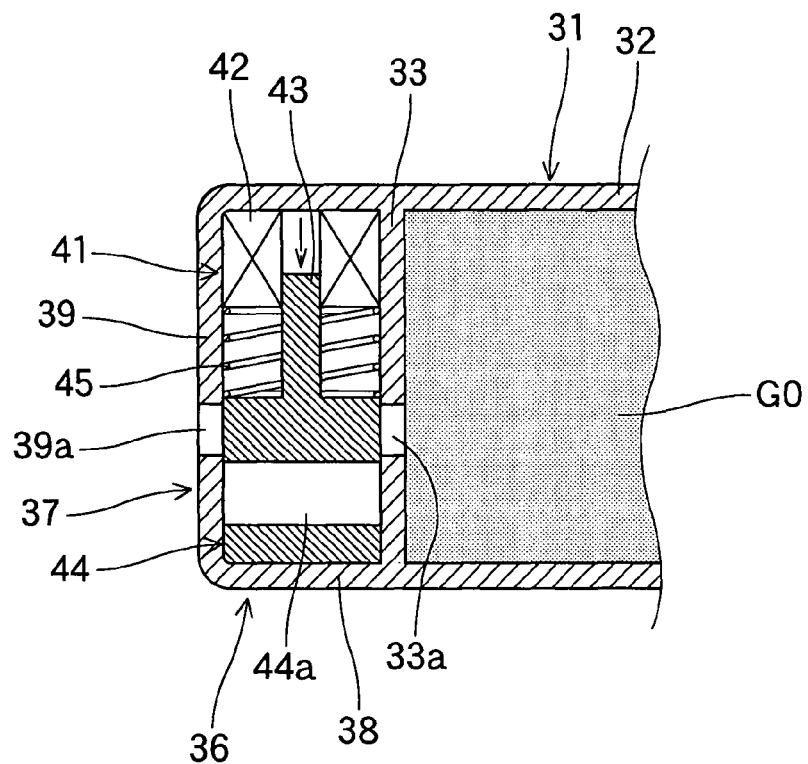
FIG. 6 is a schematic enlarged section showing a first gas supply region of the inflator body of FIG. 5.
Figure 7:
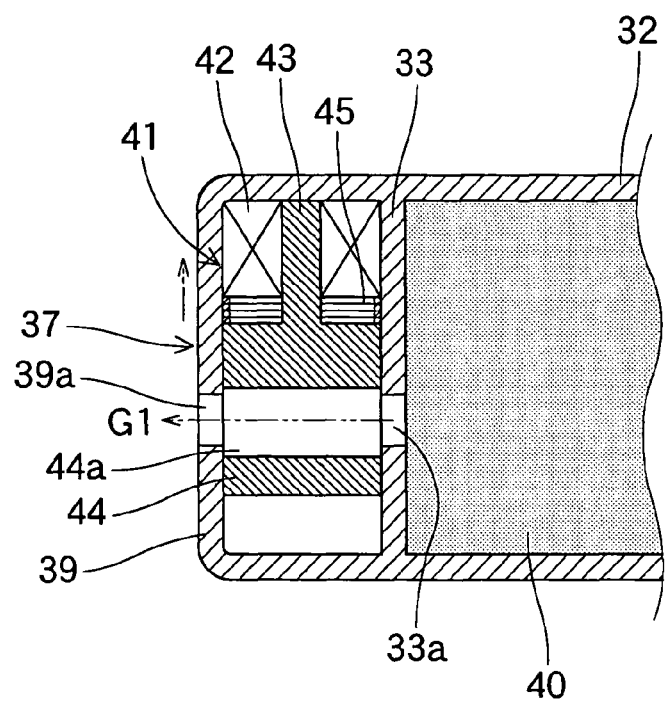
FIG. 7 is a schematic enlarged section showing an electromagnetic valve of the first gas supply region of FIG. 6 in operation.

As shown in FIGS. 5 and 6, the electromagnetic valve 41 disposed inside the first gas channel 37 includes a solenoid 42, a plunger 43 provided with a valve body 44 and a coil spring 45 disposed between the valve body 44 and the solenoid 42 to urge the valve body 44 towards a closing direction. The valve body 44 is formed at the leading end of the plunger 43, and a through hole 44a is formed through the valve body 44 along the axial direction of the inflator body 30. When the solenoid 42 is de-energized, the valve body 44 is urged by the coil spring 45 towards the closing direction and closes off the orifice 33a of the partitioning wall 33 as shown in FIG. 6. When the solenoid 42 is energized, the valve body 44 is opened, i.e. shifts towards the solenoid 42 so that the through hole 44a becomes communicated with the orifice 33a and aperture 39a as shown in FIG. 7. The solenoid 42 is electrically connected with the control device 59 and is designed to operate in advance of the operation of a later-described squib 52 of the second gas supply region 48. In the first embodiment, specifically, when the control device 59 detects an unavoidable impact before an actual impact by signals sent from the pre-crash sensor 60, the solenoid 42 is energized in response to signals from the control device 59 to open the valve body 44. If the valve body 44 is opened, the pressurized gas G0 stored in the gas generating chamber 31 is supplied into the bag body 25 as the inflation gas G1 via the aperture 39a communicated with the through hole 44a and the orifice 33a.

Back to FIG. 5, the second gas supply region 48 has a second gas channel 49 and a squib 52 disposed inside the gas channel 49. The second gas channel 49 includes a cylindrical circumferential wall 50 extending from the circumferential wall 32 of the gas generating chamber 31 in an integrated fashion and an end wall 51 closing off the leading end of the circumferential wall 50. The circumferential wall 50 is provided with a plurality of apertures 50a disposed along the circumferential direction. Each of the apertures 50a is sealed off from the interior by a sealing member 55 permeable by the inflation gas.

Figure 8:
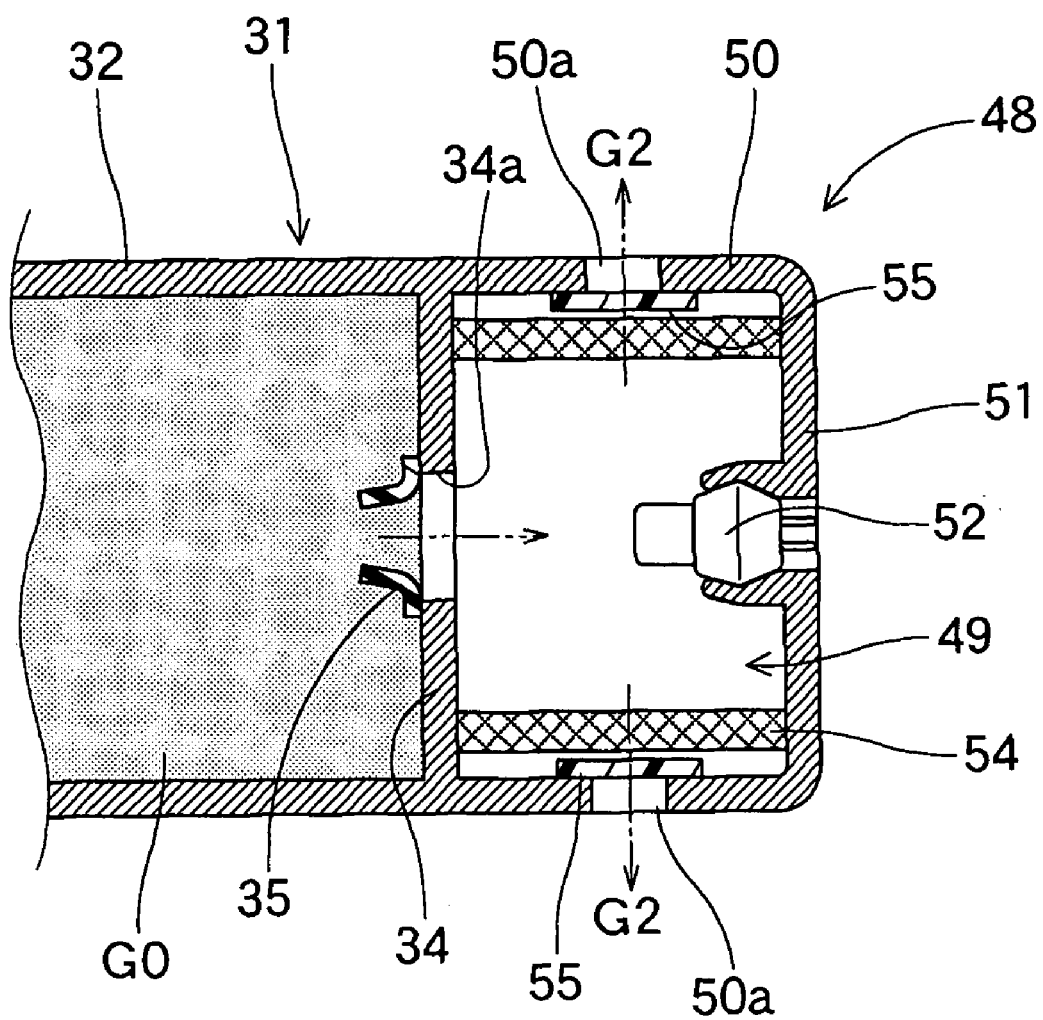
FIG. 8 is a schematic enlarged section of a second gas supply region of the inflator body of FIG. 5 showing a squib being ignited.

The squib 52 is secured at a substantial center of the end wall 51, and is connected to an unillustrated lead wire which is electrically connected with the control device 59. The squib 52 is to be ignited to generate a gas when fed with signals conveyed from the control device 59. In the first embodiment, a cylindrical filter 54 formed of a wire mesh is arranged along the inner circumference of the circumferential wall 50, and gas generant 53 are stored inside the filter 54 for combustion upon the ignition of the squib 52 to produce inflation gas. The filter 54 cools the inflation gas and catches slag resulting from the combustion of the gas generant 53. In the first embodiment, the squib 52 is ignited in response to signals fed from the control device 59 when the control device 59 detects an actual impact by signals sent from the crash sensor 61. When the squib 52 is ignited to combust the gas generant 53, gas is produced to increase the internal pressure inside the second gas channel 49. Then the sealing member 35 having sealed off the orifice 34a formed on the partitioning wall 34 of the gas generating chamber 31 is broken as shown in FIG. 8, so that the pressurized gas G0 stored inside the gas generating chamber 31 flows into the second gas channel 49, and then the pressurized gas G0 together with the gas produced by the combustion of the gas generant 53 inside the second gas channel 49 are fed into the bag body 25 as inflation gas G2 through the apertures 50a on the circumferential wall 50.

The inflator body 30 of the first embodiment is designed, when the first gas supply region 36 operates in advance and independently of the second gas supply region 48, such that the substance quantity (amount of substance, mass amount) of inflation gas G1 supplied to the bag body 25 by the first gas supply region 36 per unit time is less than the substance quantity of inflation gas G2 supplied to the bag body 25 by the second gas supply region 48 per unit time. More specifically, the orifice 34a communicating the second gas supply region 48 and the gas generating chamber 31 has a greater opening area than the orifice 33a communicating the first gas supply region 36 and the chamber 31 so that greater amount of pressurized gas G0 stored in the chamber 31 is fed into the second gas supply region 48 than into the first gas supply region 36. Moreover, the second gas supply region 48 adds the gas produced from the combustion of the gas generant 53 inside the second gas channel 49 to the pressurized gas G0 and then supplies them to the bag body 25 as the inflation gas G2. Thus the second gas supply region 48 feeds greater substance amount of inflation gas G2 to the bag body 25 per unit time than the inflation gas G1 that first gas supply region 36 feeds to the bag body 25. Consequently, the substance quantity of inflation gas G1 supplied to the bag body 25 by the first gas supply region 36 per unit time is less than the substance quantity of inflation gas G2 supplied to the bag body 25 by the second gas supply region 48 per unit time.

The diffuser 56 includes, as shown in FIG. 4, a holder region 56a having a generally cylindrical shape to cover the inflator body 30 and a plurality of (two, in this specific embodiment) bolts 56c projected from the holder region 56a. The holder region 56a is provided, on its top side as it is mounted on a vehicle, with gas outlet ports 56b letting out the inflation gasses G1 and G2 emitted from the inflator body 30 into the airbag body 25. The inflator 29 is attached to the bag holder 6, with the airbag body 25 disposed therebetween, by inserting the bolts 56*c* of the diffuser 56 through the bottom wall 7 of the bag older 6 for nut 57 fastening.

The airbag apparatus M1 according to the first embodiment is mounted on a vehicle as follows: Firstly, the folded-up airbag 24 within which the inflator 29 is housed and the micro gas generator 10 are attached to the bag holder 6, and then the pad 16 is placed over the bag holder 6 and the side wall 20 of the pad 16 is fixed to the side wall 8 of the bag older 6 with rivets. Subsequently, the joining plates 14 are attached to the pairs of the joint pieces 9 on the left and right sides of the bag holder 6 by bolts 13 together with the horn switches 11. Thus the airbag apparatus M1 is assembled. This assembled airbag apparatus M1 is attached to the steering wheel body 1 which has been mounted on the vehicle if it is joined with the unillustrated mounting seats of the wheel body 1. Thus the assembling of the steering wheel W is completed. When the airbag apparatus M1 is mounted on the vehicle, the lead wires extending from the control device 59 are connected to the solenoid 42, the squib 52 of the inflator 29 and the micro gas generator 10 for signal transfer.

If a moving vehicle equipped with the airbag apparatus M1 cracks up, the control device 59 outputs actuating signals to the inflator 29 and the micro gas generator 10, so that the airbag 24 inflates and opens the doors 19 of the pad 16 towards the front and rear, and completes inflation in such a manner as to cover the top side of the steering wheel W as shown in FIG. 11.

In the airbag apparatus M1 according to the first embodiment, the solenoid 42 of the electromagnetic valve 41 for opening the first gas supply region 36 of the inflator 29 so the inflation gas is fed into the airbag body 25 is operable before the operation of the squib 52 used to open the second gas supply region 48. Further, when the solenoid 42 operates ahead of the squib 52, the substance quantity of inflation gas G1 supplied to the airbag 24 or airbag body 25 by the first gas supply region 36 per unit time is set less than the substance quantity of inflation gas G2 supplied to the airbag 24 or airbag body 25 by the second gas supply region 48 per unit time. That is, if the first gas supply region 36 supplies the inflation gas G1 first, the airbag body 25 expands with the inflation gas G1 supplied moderately from the first gas supply region 36 and then inflates with the inflation gas G2 fed from the second gas supply region 48 whose supplied substance quantity per unit time is greater than that from the first gas supply region 36, so that the airbag 24 inflates swiftly. Accordingly, in the first embodiment, it is prevented that a great amount of inflation gas is fed into the airbag 24 rapidly in the initial stage of operation of the inflator 29 and that the internal pressure of the airbag 24 increases excessively in the initial stage of airbag inflation.

Therefore, the airbag apparatus M1 according to the first embodiment conduces to suppress an excessive increase of the internal pressure of the airbag 24 in the initial stage of airbag inflation.

Especially in the airbag apparatus M1, the control device 59 is electrically connected with the pre-crash sensor 60 which is capable of detecting an unavoidable crash of a vehicle before an actual crash and the crash sensor 61 which detects an actual crash of the vehicle, and the control device 59 operates the first gas supply region 36 of the inflator 29 upon receipt of signals from the pre-crash sensor 60 and operates the second gas supply region 48 upon receipt of signals from the crash sensor 61. In operation, when the control device 59 detects an unavoidable crash by the signals from the pre-crash sensor 60, it feeds actuating signals to the micro gas generator 10 and the solenoid 42 of the electromagnetic valve 41 of the first gas supply region 36 of the inflator 29. Then the gas generator 10 discharges inflation gas and inflates the auxiliary bag 26 so the bag 26 pushes and opens the doors 19 of the pad 16 as shown in FIG. 9, whereas the first gas supply region 36 supplies the inflation gas G1 to the airbag body 25 so it unfurls from the opening 6*a* of the bag holder 6 provided by the opening of the pad 16 as shown in FIG. 10. Then if the control device 59 detects an actual impact of the vehicle by signals from the crash sensor 61, it feeds actuating signals to the squib 52 of the second gas supply region 48 so that the gas supply region 48 supplies the inflation gas G2 into the airbag body 25, and the airbag body 25 completes inflation as shown in FIG. 11.

Figure 12:
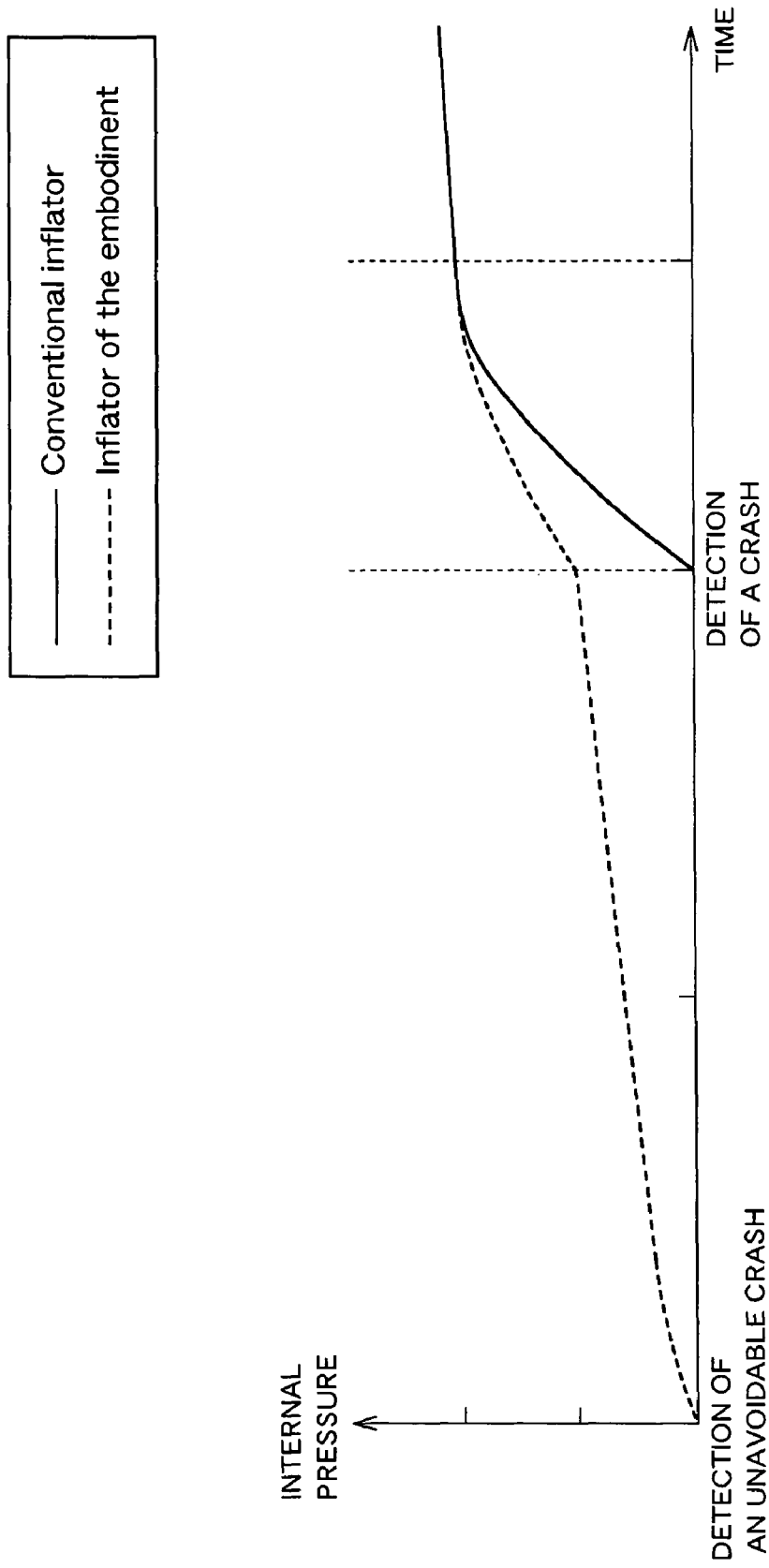
FIG. 12 is a graph showing the change of the internal pressure of the inflator of FIG. 4 in operation against time.

That is, in the airbag apparatus M1 of the first embodiment, the inflation gas G1 supplied by the first gas supply region 36 flows into the airbag body 25 of the airbag 24 gently before a detection of an actual impact so the airbag body 25 inflates gently while unfolding, and thereafter, when an actual impact is detected, the airbag body 25 is inflated to the full with the inflation gas G2 supplied by the second gas supply region 48 whose supplied substance quantity per unit time is greater than that of the inflation gas G1 fed from the first gas supply region 36. In other words, since the inflation gas G1 is supplied to the airbag 24 ahead of the detection of an actual crash, the internal pressure of the airbag 24 increases gently by the inflation gas G1 during the time period from the detection of an unavoidable crash to the detection of an actual crash as shown in a graph of FIG. 12, and the internal pressure of the airbag 24 is suppressed from increasing rapidly during the time period from the detection of an actual crash till the completion of inflation in comparison with an instance where an airbag starts to inflate upon a detection of an actual crash using a conventional inflator. Therefore, when the airbag apparatus M1 is directed to protect a driver or an occupant during the time period from the detection of a crash to the full inflation of the airbag 24, the airbag 24 does not apply an undue pressure to the driver, and moreover, since the airbag 24 already has an internal pressure of a certain level at the time of the crash, it protects the driver smoothly with a good cushioning property. Of course, in the airbag apparatus M1, too, the airbag 24 completes inflation after the detection of a crash and is kept fully inflated for a certain time period in a similar manner to an instance where an airbag starts to be inflated after a detection of a crash.

The airbag apparatus M1 may also be designed such that the solenoid 42 of the first gas supply region 36 and the squib 52 of the second gas supply region 48 are actuated generally simultaneously in the event that the pre-crash sensor 60 fails to predict a potential crash and the control device 59 detects a crash of a vehicle by the crash sensor 61. In this instance, the airbag body 25 is inflated swiftly after an actual crash is detected in the event that an unavoidable crash were not detected.

In the airbag apparatus M1, because the gas generant 53 is housed inside the second gas channel 49 of the second gas supply region 48 to be combusted to produce inflation gas upon the ignition of the squib 52, the inflation gas is produced by the combustion of the gas generant 53 in addition to the gas produced by the squib 52. With this arrangement, the internal pressure of the second gas channel 49 is increased rapidly, so the sealing member 35 is torn rapidly. Further in the first embodiment, the substance quantity of the inflation gas supplied by the second gas supply region 48 is augmented by the inflation gas generated by the combustion of the gas generant 53, so that the airbag body 25 is inflated further swiftly. Of course, if this advantage does not have to be considered, the second gas supply region 48 may be designed without gas generant 53 stored in the second gas channel 49 so the sealing member is torn only by the gas generated from the squib.

Although the sealing member 35 of the first embodiment is designed to be broken by the internal pressure of the gas generated inside the second gas channel 49, the sealing member may also be designed to be broken by a pin or the like which is driven by an actuator mounted on the apparatus separately.

Moreover, the inflator body 30 of the airbag apparatus M1 of the first embodiment is designed to include a single gas generating chamber 31 and two gas supply regions 36 and 48 both of which are communicated with the gas generating chamber 31, which simplifies the structure of the inflator.

Figure 13:
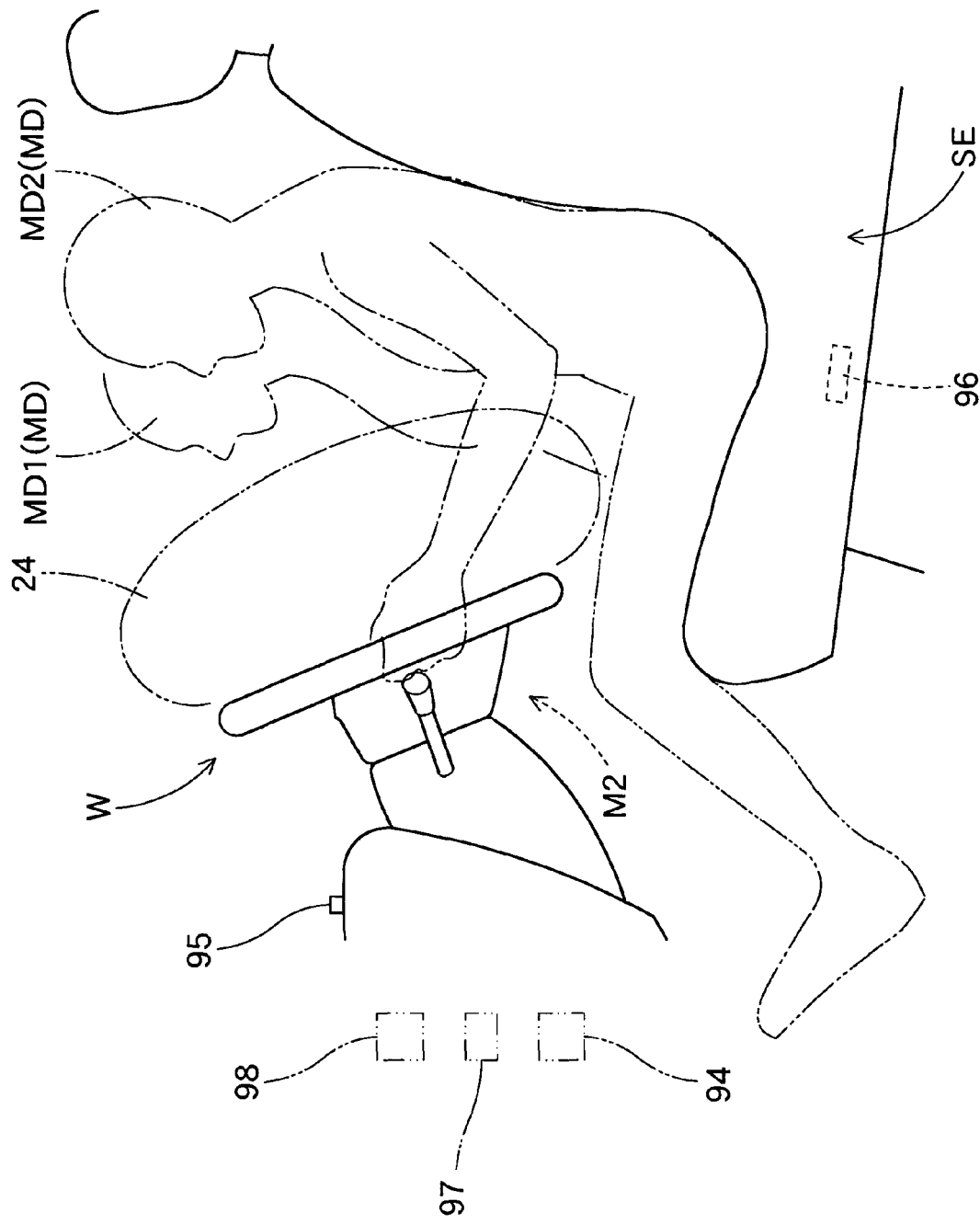
FIG. 13 schematically illustrates a steering wheel and its vicinity of a vehicle equipped with an airbag apparatus according to a second embodiment of the present invention.
Figure 14:
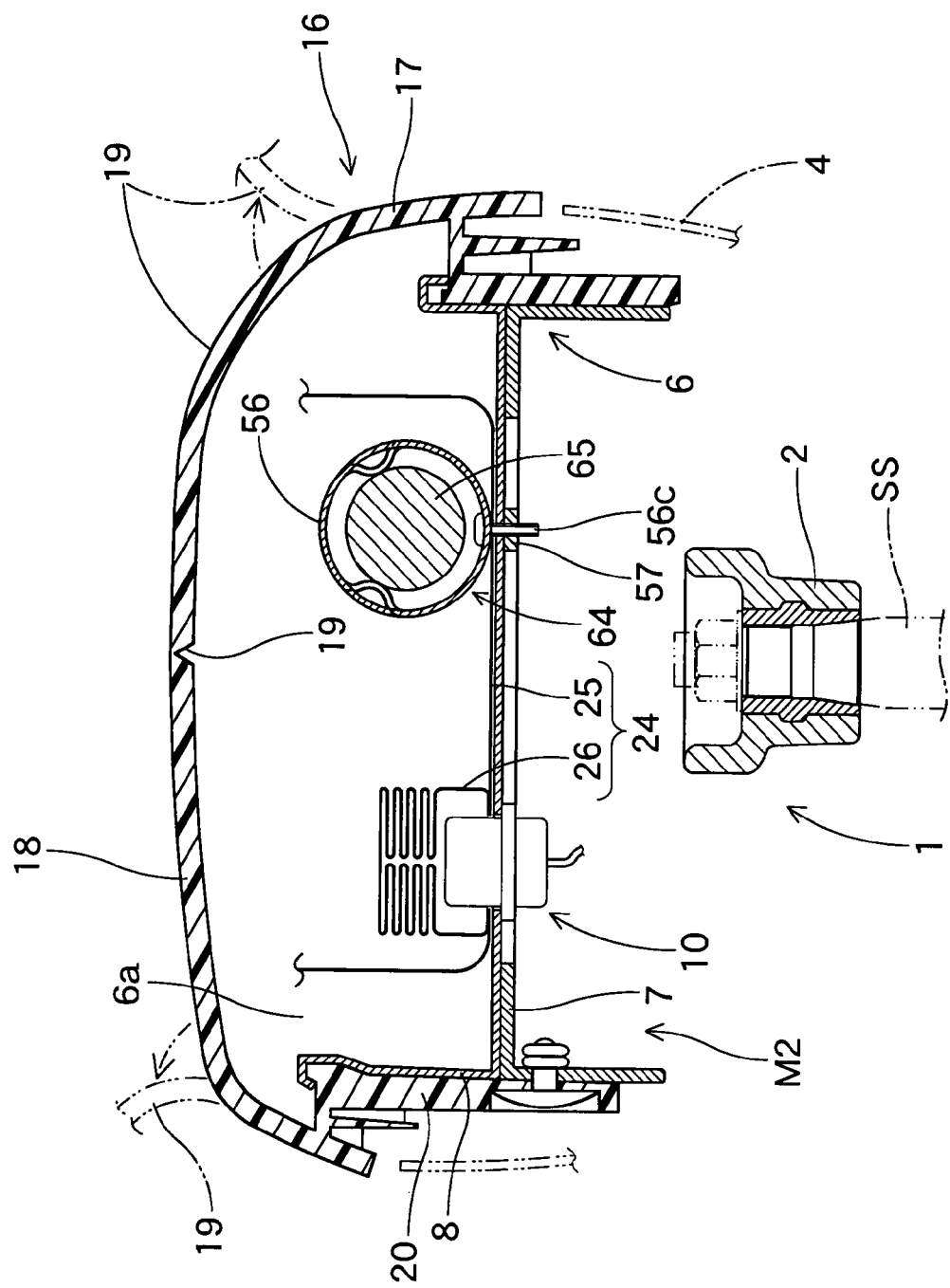
FIG. 14 is a schematic section of the airbag apparatus of the second embodiment.

The second embodiment of the present invention is now described. An airbag apparatus M2 according to the second embodiment shown in FIGS. 13 and 14 is adapted to be mounted on a steering wheel W in a similar manner to the airbag apparatus M1 of the first embodiment. The apparatus M2 has a similar structure to the apparatus M1 except an inflator 64, and therefore, descriptions on the same components will be omitted by giving those components common reference numerals. The gas generator 10 and the inflator 64 are controlled by a control device 94 in the airbag apparatus M2 of the second embodiment.

As shown in FIG. 13, the control device 94 is electrically connected with occupant sensors such as a position sensor 95 for detecting the size of an occupant or driver MD seated in a seat SE and the distance between the steering wheel W and the occupant MD and a weight sensor 96 for detecting the weight of the occupant MD, a pre-crash sensor 97 such as a millimeter wave radar which can predict an impact, and a crash sensor 98 such as an acceleration sensor for detecting the deceleration of a vehicle upon an actual impact. The control device 94 operates the gas generator 10 and the inflator 64 in response to electric signals fed from these sensors 95, 96, 97 and 98.

As in the airbag apparatus M1 described herein before, the inflator 64 has a cylindrical contour and includes a generally columnar inflator body 65 and a generally cylindrical diffuser 56 mounted around the inflator body 65. Descriptions of the diffuser 56 will be omitted since it has a similar structure to the diffuser 56 used in the inflator 29 of the above-described airbag apparatus M1. The diffuser 56 will be referred to using the same reference numeral as the diffuser 56 of the first embodiment.

As shown in FIG. 15, the inflator body 65 includes a first gas generating chamber 66 and a second gas generating chamber 67 partitioned off by a partitioning wall 68 arranged axially and respectively filled up with pressurized gases G3 and G4, which are compressed gases for inflating the airbag, a gas outlet region 76 disposed at first leading ends of the first gas generating chamber 66 and the second gas generating chamber 67, and a first gas supply region 82 and a second gas supply region 91 disposed at positions in the gas outlet region 76 corresponding to the first gas generating chamber 66 and the second gas generating chamber 67, respectively.

As shown in FIG. 15, the first gas generating chamber 66 is defined by a circumferential wall 69 having a generally cylindrical shape, the partitioning wall 68 arranged along the axial direction of the circumferential wall 69 in such a manner as to partition off an inner space of the circumferential wall 69 into two and generally round lids 70 and 71 disposed to close off opposite axial ends of the circumferential wall 69. The first gas generating chamber 66 is filled up with pressurized gas or gas material G3 such as nitrogen gas, helium gas, argon gas, or mixed gas of those gasses. Similarly to the first gas generating chamber 66, the second gas generating chamber 67 is defined by the circumferential wall 69, the partitioning wall 68 and the lids 70 and 71 and is filled up with pressurized gas or gas material G4 such as nitrogen gas, helium gas, argon gas, or mixed gas of those gasses. In this specific embodiment, each of the quantities of the gasses G3 and G4 filling up the first gas generating chamber 66 and the second gas generating chamber 67 is a quantity capable of producing inflation gasses G5 and G6 enough to keep the airbag 24 fully inflated respectively on its own. Specifically, each of the first and second gas generating chambers 66 and 67 is charged with 2 mol of the pressurized gas G3/G4.

The lid 70 disposed adjacent the gas outlet region 76 includes orifices 70a and 70b each having a generally round contour and communicating each of the first gas generating chamber 66 and second gas generating chamber 67 with the gas outlet region 76. In this specific embodiment, the orifices 70a and 70b have generally the same opening areas. The orifices 70a and 70b are closed off by rupture disks 73 and 74, respectively, which disks 73 and 74 are secured to peripheries of the orifices 70a and 70b. The rupture disk 73 closing off the orifice 70a of the first gas generating chamber 66 is designed to rupture only when a later-described needle 83 of the first gas supply region 82 moves over toward the first gas generating chamber 66. Except that occasion, the disk 73 blocks up the orifice 70a so that the pressurized gas G3 stored inside the gas generating chamber 66 may not flow out of the chamber 66. The rupture disk 74 closing off the orifice 70b of the second gas supply region 67 is designed to rupture only upon the operation of a later-described squib 92 of the second gas supply region 91. Except that occasion, the disk 74 blocks up the orifice 70b so that the pressurized gas G4 stored inside the gas generating chamber 67 may not flow out of the chamber 67.

Figure 17:
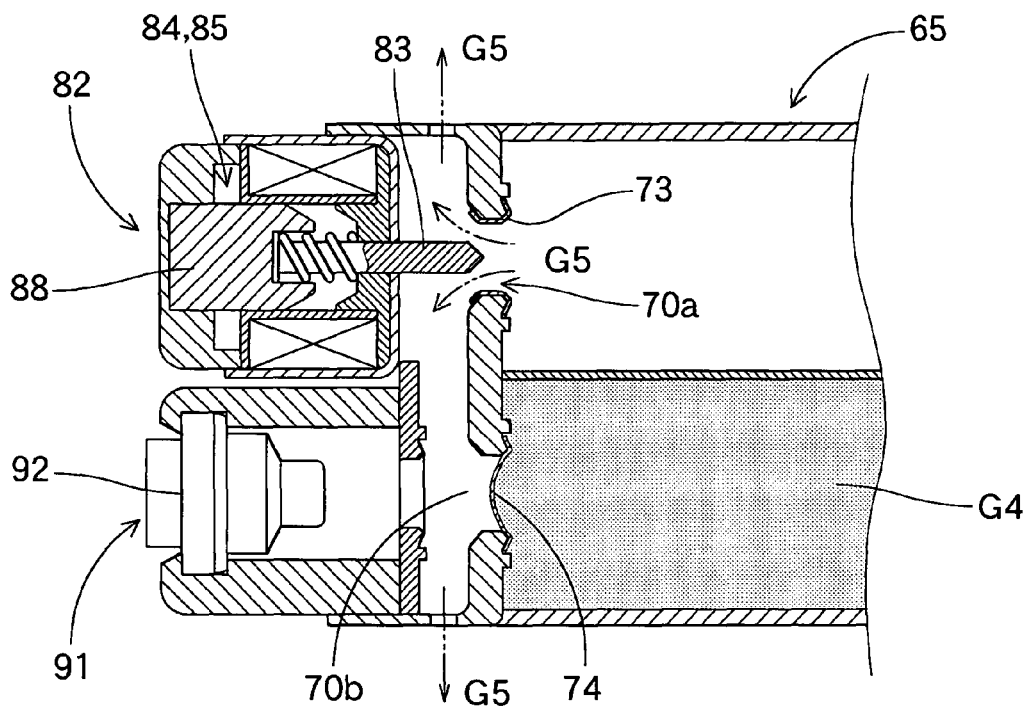
FIG. 17 is a schematic partial section of the inflator body of FIG. 15 where only the first gas supply region is in operation.
Figure 18:
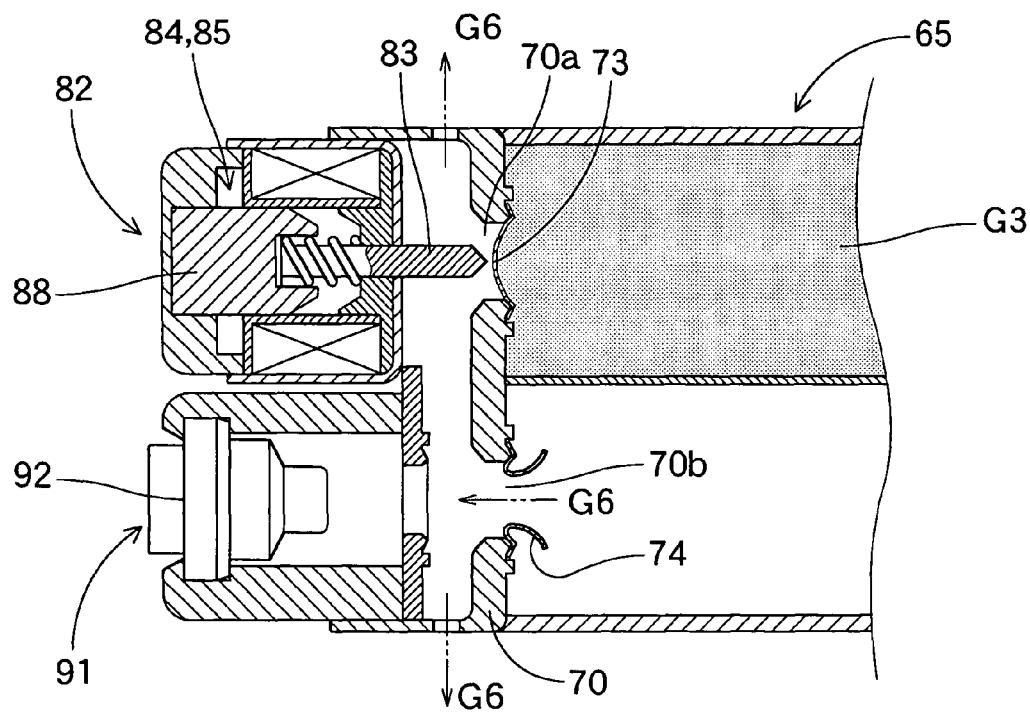
FIG. 18 is a schematic partial section of the inflator body of FIG. 15 where only the second gas supply region is in operation.
Figure 19:
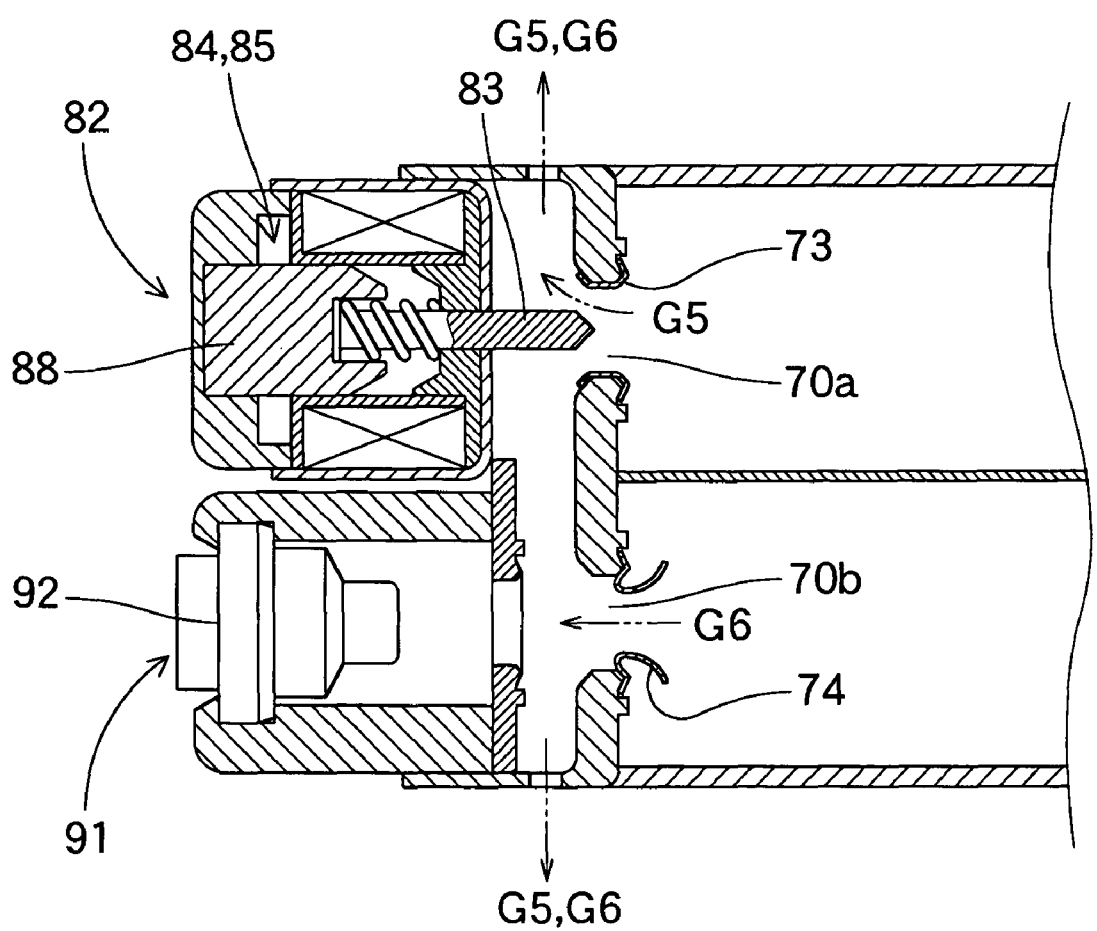
FIG. 19 is a schematic partial section of the inflator body of FIG. 15 where the first gas supply region and the second gas supply region are in operation.

The gas outlet region 76 is arranged to cover the lid 70 and includes a circumferential wall 77 and a holder region 78 which closes off the circumferential wall 77 and holds the first gas supply region 82 and the second gas supply region 91. The first gas supply region 82 and the second gas supply region 91 are respectively disposed at positions of the holder region 78 opposing the orifices 70a and 70b of the lid 70. In this embodiment, the first gas supply region 82 and the second gas supply region 91 are designed to operate independently from each other when fed with actuating signals from the control device 94. The circumferential wall 77 is provided with numerous gas discharge ports 77a arranged along the circumferential direction. When the first gas supply region 82 and the second gas supply region 91 operate, the inflation gasses G5 and G6 are emitted out of the orifices 70a and 70b and flow through an outlet channel 79 enclosed by the circumferential wall 77 and the holder region 78, and then discharged from the discharge ports 77a into the airbag 24 (FIGS. 17-19).

Figure 16A:
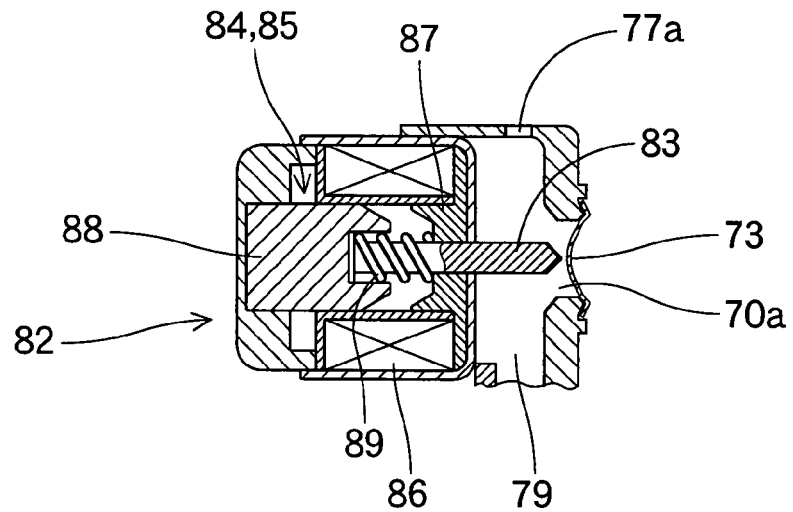
FIGS. 16A to 16C are schematic partial enlarged sections showing a first gas supply region of the inflator body of FIG. 15 in operation in order.

The first gas supply region 82 includes a needle 83 disposed to oppose the rupture disk 73 and a drive mechanism 84 (FIGS. 16A-16C) operating the needle 83. The drive mechanism 84 is formed of an electromagnetic solenoid 85 and which solenoid 85 includes a coil 86, a stationary core 87, and a movable core 88. The solenoid 85 operates to move the movable core 88 toward the stationary core 87 disposed towards a root region of the inflator 64 when a current is passed through the coil 86. The electromagnetic solenoid 85 is electrically connected with the control device 94 by an unillustrated lead wire so it operates in response to actuating signals from the control device 94. The solenoid 85 is designed to operate in advance of the operation of a later-described squib 92 of the second gas supply region 91. Specifically in this embodiment, the solenoid 95 operates in response to the signals from the control device 94 detecting an unavoidable crash before an actual crash by signals fed from the pre-crash sensor 97. A member shown by reference numeral 89 in FIGS. 16A-16C is a spring for returning the movable core 88 together with the needle 83 to the original position when the solenoid 85 is de-energized.

The needle 83 is held by the movable core 83 for movement along a direction orthogonal to an opening plane of the orifice 70a. As shown in FIGS. 16A and 16B, when the solenoid 85 is actuated, the needle 83 hits and breaks the rupture disk 73 and further enters into the first gas generating chamber 66.

The second gas supply region 91 includes a squib 92 disposed to oppose the rupture disk 74 closing off the orifice 70b. The squib 92 is electrically connected with the control device 94 by an unillustrated lead wire so it operates in response to actuating signals from the control device 94. When activated, the squib 92 generates a small amount of combustion gas so that the pressure of the gas ruptures the rupture disk 74. Specifically, the squib 92 operates in response to the signals from the control device 94 detecting an actual crash by signals fed from the crash sensor 98.

Figure 16B:
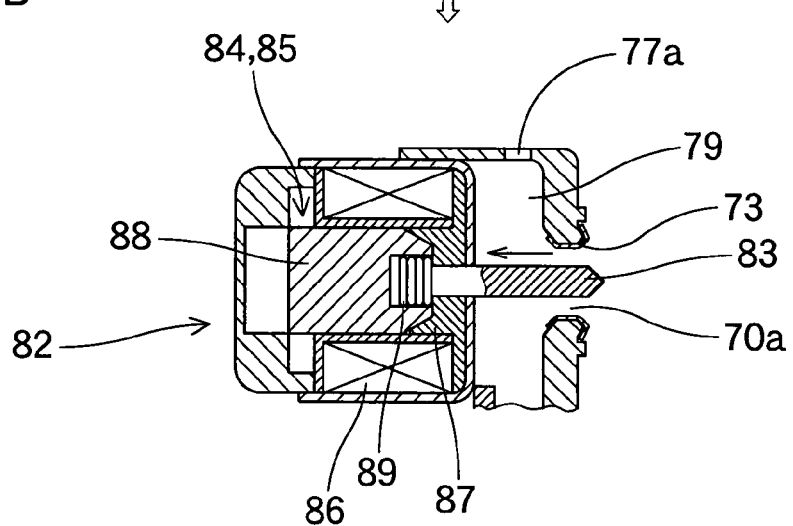
Figure 16C:
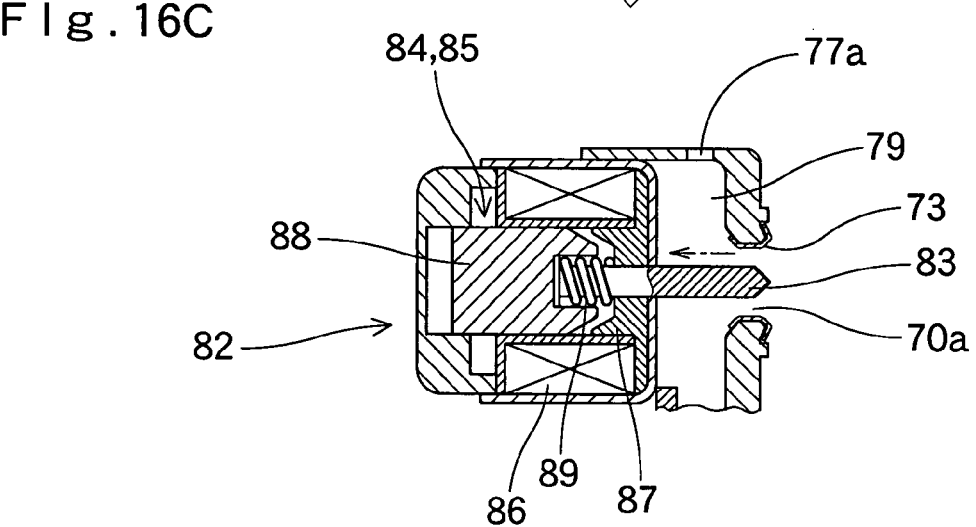

When the electromagnetic solenoid 85 of the first gas supply region 82 operates, the needle 83 enters into the orifice 70a and breaks the rupture disk 73 as shown in FIG. 16B, and then returns to the original position utilizing a restoring force of the spring 89 as shown in FIG. 16C. FIG. 16C illustrates the spring 89 being in restoration movement, and when the spring 89 is completely restored, the needle 83 returns to the position shown in FIG. 16A. In the orifice 70a of the first gas generating chamber 66, in comparison with the orifice 70b where the rupture disk 74 is broken to open the orifice 70b instantly upon the operation of the squib 92, it takes the needle 83 fed with the actuating signals a certain time period before breaking the rupture disk 73, and a substantial opening area of the orifice 70a when the rupture disk 73 is broken is smaller than that of the orifice 70b by a sectional area of the needle 83 (FIG. 16C) in the initial stage of discharge of the inflation gas G5. Accordingly, although the orifice 70a of the first gas generating chamber 66 and the orifice 70b of the second gas generating chamber 67 have generally the same opening areas, the substance quantity of inflation gas G5 supplied to the airbag body 25 by the first gas supply region 82 per unit time is less than the substance quantity of inflation gas G6 supplied to the airbag body 25 by the second gas supply region 91 per unit time in the initial stage of airbag inflation.

In the airbag apparatus M2 according to the second embodiment of the present invention, too, the substance quantity of inflation gas G5 supplied to the airbag 24 or airbag body 25 by the first gas supply region 82 of the inflator 64 per unit time is less than the substance quantity of inflation gas G6 supplied to the airbag 24 or airbag body 25 by the second gas supply region 91 per unit time. That is, with the operation of only the first gas supply region 82 in the initial stage of airbag inflation, the airbag body 25 expands and inflates with the inflation gas G5 supplied moderately from the first gas supply region 82. Accordingly, in the second embodiment, too, it is prevented that a great amount of inflation gas is fed into the airbag 24 rapidly in the initial stage of operation of the inflator 64 and that the internal pressure of the airbag 24 increases excessively in the initial stage of airbag inflation.

Therefore, the airbag apparatus M2 according to the second embodiment conduces to suppress an excessive increase of the internal pressure of the airbag 24 in the initial stage of airbag inflation.

Especially in the airbag apparatus M2 of the second embodiment, the inflator body 65 includes the first gas generating chamber 66 and the second gas generating chamber 67 partitioned off by a partitioning wall 68, and the first gas supply region 82 arranged to correspond to the first gas generating chamber 66 and the second gas supply region 91 arranged to correspond to the second gas generating chamber 67 are operable independently from each other. Further, each of the first gas generating chamber 66 and the second gas generating chamber 67 is charged with the gas G3/G4 as gas material capable of producing the inflation gas G5/G6 enough to keep the airbag body 25 or airbag 24 fully inflated on its own.

Figure 20:
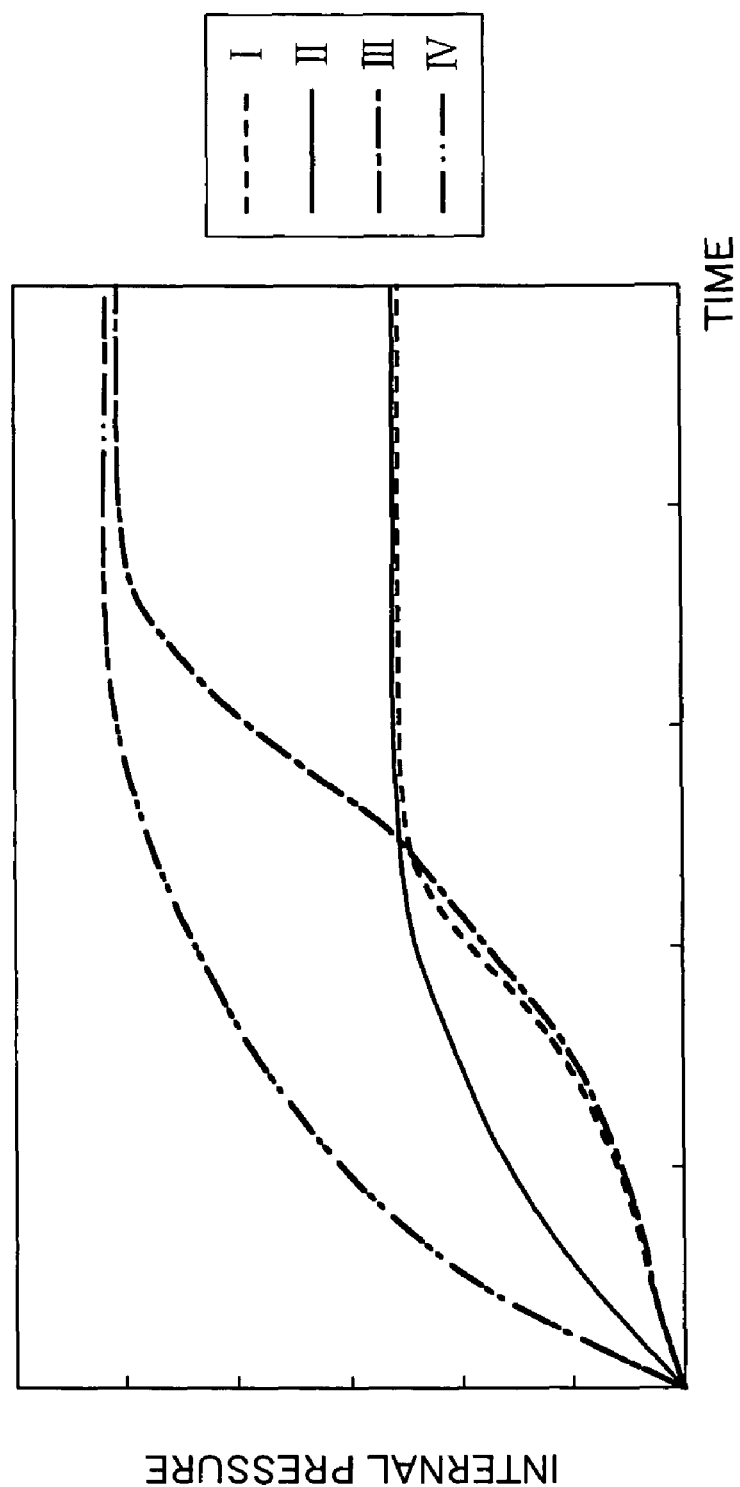
FIG. 20 is a graph showing changes of the internal pressure of the inflator of the second embodiment in operation against time.

With this structure, the quantities of the gasses G5 and G6 discharged from the inflator 64 can be varied depending upon the physical size or seating position of vehicle occupants M1/M2. Specifically, the inflator 64 of the second embodiment is enabled to have four modes of operation, i.e. modes I-IV shown in a graph of FIG. 20, of discharging inflation gas from the gas discharge ports 77a of the inflator body 65.

In Mode I, only the first gas supply region 82 operates as shown in FIG. 17. Mode I is preferable in an instance, for example, where the control device 94 having detected that an undersized occupant MD1 (MD) is seated proximate the steering wheel W (FIG. 13) by signals from the position sensor 95 and weight sensor 96 and detects an unavoidable crash before an actual crash by signals fed from the pre-crash sensor 97. If the inflator 64 operates in Mode I, the inflation gas G5 emitted out of the orifice 70a opened by the operation of the electromagnetic solenoid 85 of the first gas supply region 82 flows into the airbag body 25 gently so that the airbag body 25 unfolds and inflates gradually, before an actual crash is detected. Hence the fully inflated airbag 24 protects the undersized occupant MD1 seated proximate the steering wheel W softly without pressing the occupant MD1 unduly.

In Mode II, only the second gas supply region 91 operates as shown in FIG. 18. Mode II is preferable in an instance, for example, where the control device 94 having detected an undersized occupant MD1 seated proximate the steering wheel W fails to detect a potential crash by the pre-crash sensor 97 but detects an actual crash by the crash sensor 98. If the inflator 64 operates in Mode II, the second gas supply region 91 is actuated to operate the squib 92 to open the orifice 70b so that the inflation gas G6 emitted out of the orifice 70b flows into the airbag body 25 swiftly to inflate the airbag body 25. Hence, the airbag 24 swiftly inflated protects the undersized occupant MD1 properly even if the occupant MD1 is seated proximate the steering wheel W.

In Mode III, the first gas supply region 82 and the second gas supply region 91 operate as shown in FIG. 19. Specifically, the second gas supply region 91 operates after the first gas supply region 82. Mode III is preferable in an instance, for example, where the control device 94 detects that a large occupant MD2 (MD) is seated away from the steering wheel W (FIG. 13) by signals from the position sensor 95 and weight sensor 96 and detects an unavoidable crash before an actual crash by signals fed from the pre-crash sensor 97. If the inflator 64 operates in Mode III, the inflation gas G5 emitted out of the orifice 70a opened by the operation of the electromagnetic solenoid 85 of the first gas supply region 82 flows into the airbag body 25 gently so that the airbag body 25 unfolds and inflates gradually, before an actual crash is detected. Further the inflation gas G6 supplied by the second gas supply region 91 helps keep the internal pressure of the fully inflated airbag body 25 for a prolonged time period even if the airbag body 25 is provided with an unillustrated vent hole for exhausting extra gas. Hence the airbag 24 does not press the large occupant MD2 unduly and protects the occupant MD2 properly while preventing the occupant MD2 from bottoming out even if the occupant MD2 having seated away from the steering wheel W moves forward a while after the completion of airbag inflation since the internal pressure of the airbag 24 is kept high.

Mode IV is a mode where the first gas supply region 82 and the second gas supply region 91 operate as shown in FIG. 19. Specifically, the first gas supply region 82 and the second gas supply region 91 operate generally simultaneously. Mode IV is preferable in an instance, for example, where the control device 94 having detected a large occupant MD2 seated away from the steering wheel W fails to detect a potential crash by the pre-crash sensor 97 but detects an actual crash by the crash sensor 98. If the inflator 64 operates in Mode IV, the second gas supply region 91 is actuated to operate the squib 92 to open the orifice 70*b* so that the inflation gas G6 emitted out of the orifice 70*b* flows into the airbag body 25 swiftly to inflate the airbag body 25 while the inflation gas G5 supplied by the first gas supply region 82 flows into the airbag body 25. Hence the airbag 24 completes inflation swiftly and protects the large occupant MD2 properly. Further, in the event that the occupant MD2 having seated away from the steering wheel W moves forward awhile after the completion of airbag inflation, the airbag 24 protects the occupant MD2 properly while preventing the occupant MD2 from bottoming out, since the internal pressure of the airbag 24 is kept high.

Therefore, with the airbag apparatus M2 of the second embodiment, the quantity of the gas discharged from the inflator 64 can be varied depending upon the physical size or seating position of the occupants MD1/MD2, so that the fully inflated airbag 24 protects the occupants MD1 and MD2 properly.

In the second embodiment, the first gas generating chamber 66 and the second gas generating chamber 67 of the inflator body 65 is respectively charged with 2 mol of the pressurized gas G3/G4, the substance quantity being a quantity enough to inflate the airbag 24 (airbag body 25) fully on its own. However, it will also be appreciated that the first gas generating chamber 66 and the second gas generating chamber 67 is respectively charged with 1 mol of the pressurized gas which is a half of the substance quantity required to inflate the airbag 24 fully, and that both of the first and second gas supply regions operate upon airbag deployment. An inflator structured like this will operate similarly to the inflator 29 of the first embodiment.

Although the foregoing embodiments have been described as applied to an airbag apparatus for a steering wheel, the application of the present invention should not be limited thereby. The present invention can be applied to an airbag apparatus for a front passenger's seat, an airbag apparatus for head-protection or knee-protection, a side-impact airbag apparatus, and an airbag apparatus for pedestrian protection.

What is claimed is:

1. An airbag apparatus comprising
an airbag housed in a folded state; and
an inflator including a gas storing chamber filled up with a pressurized gas, which gas is a compressed gas for inflating the airbag, a first gas supply region and a second gas supply region that respectively supply inflation gas into a bag body included in the airbag under control of a control device, the first and second gas supply regions being communicable with the gas storing chamber, the first gas supply region including a first aperture that supplies the inflation gas into the bag body, the second gas supply region including a second aperture that supplies the inflation gas into the bag body,
wherein the first gas supper region being operable independently from the second gas supply region and in advance of the second gas supply region;
wherein a substance quantity of inflation gas supplied to the airbag by the first gas supply region per unit time at the time the first gas supply region operates independently and in advance of the second gas supply region is less than a substance quantity of inflation gas supplied to the bag body in the airbag by the second gas supply region per unit time;
wherein the second gas supply region includes a second gas channel disposed adjacent the gas storing chamber and partitioned from the gas storing chamber by a sealing member, a squib disposed inside the second gas channel, and a gas generant stored inside the second gas channel for combustion when ignited by the squib to generate an inflation gas, and
wherein the sealing member operates to provide communication between the second gas channel and the gas storing chamber when an internal pressure inside the second gas channel is increased due to combustion of the gas generant,
wherein a first opening communicating between the gas storing chamber and the first gas supply region has a smaller opening area than a second opening communicating between the gas storing chamber and the second gas supply region, to provide less inflation gas from the first opening than from the second opening.

2. The airbag apparatus of claim 1, wherein:
the control device is electrically connected with a pre-crash sensor which is capable of detecting an unavoidable crash of a vehicle before an actual crash and a crash sensor which detects an actual crash of the vehicle; and
the control device operates the first gas supply region upon receipt of signals from the pre-crash sensor and operates the second gas supply region upon receipt of signals from the crash sensor.

3. The airbag apparatus of claim 2, wherein the first gas supply region and the second gas supply region are operable substantially simultaneously.

4. The airbag apparatus of claim 1, wherein:
the control device is electrically connected with a pre-crash sensor which is capable of detecting an unavoidable crash of a vehicle before an actual crash and a crash sensor which detects an actual crash of the vehicle; and
the control device operates the first gas supply region upon receipt of signals from the pre-crash sensor and operates the second gas supply region upon receipt of signals from the crash sensor.

5. The airbag apparatus of claim 1, wherein:
the first gas supply region includes a first gas channel communicating with a gas generating chamber and a valve mechanism operating to open and close the first gas channel.

6. The airbag apparatus of claim 1, the gas storing chamber being a single gas storing chamber communicable with the first and second gas supply regions.

* * * * *